(12) United States Patent
Rotter et al.

(10) Patent No.: US 9,221,236 B1
(45) Date of Patent: *Dec. 29, 2015

(54) SYSTEMS AND METHODS FOR ASSEMBLING STIFFENED COMPOSITE STRUCTURES

(71) Applicant: The Boeing Company, Seal Beach, CA (US)

(72) Inventors: Daniel M. Rotter, Lake Forest Park, WA (US); Brian G. Robins, Renton, WA (US); Brad Andrew Coxon, Everett, WA (US)

(73) Assignee: The Boeing Company, Chicago, IL (US)

( * ) Notice: Subject to any disclaimer, the term of this patent is extended or adjusted under 35 U.S.C. 154(b) by 262 days.

This patent is subject to a terminal disclaimer.

(21) Appl. No.: 14/012,911

(22) Filed: Aug. 28, 2013

Related U.S. Application Data

(63) Continuation-in-part of application No. 13/733,036, filed on Jan. 2, 2013.

(51) Int. Cl.
| | |
|---|---|
| *B29C 65/00* | (2006.01) |
| *B32B 37/00* | (2006.01) |
| *B32B 37/10* | (2006.01) |

(52) U.S. Cl.
CPC ............... *B32B 37/10* (2013.01); *B29C 65/00* (2013.01); *B32B 37/00* (2013.01); *B29C 66/004* (2013.01); *B29C 66/005* (2013.01); *B29C 66/0042* (2013.01); *B29C 66/00145* (2013.01)

(58) Field of Classification Search
CPC .......... B64C 1/06; B64C 1/061; B64C 1/064; B64C 1/068; B64C 1/069; B64C 1/12; B64C 3/18; B64C 3/182; B64C 3/20; B64C 3/24; B64C 3/26; B29C 65/00; B29C 66/00145; B29C 66/004; B29C 66/0042; B29C 66/005; B29C 66/0002; B29C 70/30; B29C 7/34; B29C 70/345; B29C 70/86; B29C 70/32; B29C 70/681; B29C 70/38; B32B 37/00; B32B 37/10; B32B 37/1018
USPC ........................................................ 156/566
See application file for complete search history.

(56) References Cited

U.S. PATENT DOCUMENTS

| | | | |
|---|---|---|---|
| 4,980,013 A | 12/1990 | Lowery | |
| 7,459,048 B2 * | 12/2008 | Pham et al. | ................... 156/173 |

(Continued)

OTHER PUBLICATIONS

U.S. Appl. No. 13/626,452, filed Sep. 25, 2012, Robins et al.

(Continued)

*Primary Examiner* — Christopher Schatz
*Assistant Examiner* — Matthew Hoover
(74) *Attorney, Agent, or Firm* — Dascenzo Intellectual Property Law, P.C.

(57) ABSTRACT

Methods of and systems for assembling stiffened composite structures are disclosed. Some methods include loading a stiffener onto an inner mold line layup mandrel and then loading a filler structure within the stiffener cavity of the stiffener. Some methods include loading, with a loading tool, a stiffener charge and a filler structure onto an inner mold line layup mandrel so the respective stiffener charge conforms to a stiffener form of the inner mold line layup mandrel to form a stiffener. Some methods include loading, with a loading tool, a stiffener and a filler structure onto an inner mold line layup mandrel.

20 Claims, 10 Drawing Sheets

(56) References Cited

U.S. PATENT DOCUMENTS

| | | | |
|---|---|---|---|
| 7,597,772 B2* | 10/2009 | Martinez Cerezo et al. | 156/169 |
| 2009/0320292 A1 | 12/2009 | Brennan et al. | |
| 2010/0239865 A1* | 9/2010 | Kallinen | 428/411.1 |
| 2013/0036922 A1* | 2/2013 | Stewart et al. | 100/35 |

OTHER PUBLICATIONS

U.S. Appl. No. 13/732,961, filed Jan. 2, 2013, Rotter et al.
U.S. Appl. No. 13/733,036, filed Jan. 2, 2013, Rotter et al.

* cited by examiner

SYSTEMS AND METHODS FOR ASSEMBLING STIFFENED COMPOSITE STRUCTURES

RELATED APPLICATION

The present application is a continuation-in-part of, and claims priority to, U.S. patent application Ser. No. 13/733,036, filed on Jan. 2, 2013 and entitled "SYSTEMS AND METHOD FOR ASSEMBLING STIFFENED COMPOSITE STRUCTURES," the complete disclosure of which is hereby incorporated by reference.

FIELD

The present disclosure relates to the assembly of stiffened composite structures.

BACKGROUND

Stiffened composite structures are structures that are constructed of composite materials, such as fiber reinforced composite materials, and typically include some form of structural frame that carries a skin. Some modern aircraft fuselages are examples of stiffened composite structures that include a skin operatively coupled to frame members that extend circumferentially around and that are spaced longitudinally along the inside of the fuselage and stringers that extend longitudinally along and that are spaced circumferentially around the inside of the fuselage. Typically, stiffened composite fuselages are constructed utilizing an inner mold line layup mandrel that includes stringer cavities, or forms, that extend longitudinally along the mandrel. Working from the top of the inner mold line layup mandrel, stringers are hand positioned in the stringer cavities. Typical stringers, such as hat-shaped stringers, define cavities themselves, with these cavities needing to be filled with a structure that will result in a flush surface to which the skin may be applied. These filler structures often are referred to as stringer mandrels or stringer bladders. In addition to the stringer mandrels, radius fillers, or noodles, are used at the interfaces between the outer most edges of the stringer mandrels and the stringers to ensure a smooth transition between the outer surfaces of the stringer mandrels and the stringer flanges to which the skin will be applied. Following their placement, the stringer mandrels and noodles are vacuum compacted in batches so that the stringer mandrels and noodles remain in place for subsequent application of the skin. The vacuum compacting process utilizes a gas-impermeable flexible sheet of material that extends across the outer surface of the inner mold line layup mandrel and that is sealed to the inner mold line layup mandrel around the outer perimeter of the stringers and associated stringer mandrels and noodles that are being compacted. A vacuum is then applied between the sheet of material and the inner mold line layup mandrel to compress the stringer mandrels into the stringers. This process is referred to in the aerospace industry as "bagging." The loading of the stringers and the installation of the stringer mandrels and noodles, as well as the bagging process and the compacting process, are performed on the upper side of the inner mold line layup mandrel, which, for a fuselage of a commercial aircraft, can be very large. Moreover, these processes are all labor and time intensive.

SUMMARY

Systems and methods for assembling stiffened composite structures are disclosed herein.

Some methods according to the present disclosure include providing a supply of stiffeners; providing a supply of filler structures; loading a respective stiffener from the supply of stiffeners onto an inner mold line layup mandrel; positioning a respective filler structure from the supply of filler structures on an upper side of a filler location tool; following the loading and the positioning, locating, with the filler location tool, the respective filler structure within the stiffener cavity of the respective stiffener; repeating the loading, the positioning, and the locating to load a plurality of stiffeners onto the inner mold line layup mandrel and to locate a plurality of filler structures within the stiffener cavities of the plurality of stiffeners; and following the repeating, affixing a skin segment over the plurality of filler structures and to the plurality of stiffeners loaded on the inner mold line layup mandrel to form at least a portion of the stiffened composite structure.

Some methods according to the present disclosure include providing a supply of filler structures; providing a supply of stiffener charges; positioning a respective filler structure from the supply of filler structures on an upper side of a loading tool; positioning a respective stiffener charge from the supply of stiffener charges on an upper side of the respective filler structure; following the positioning the respective filler structure and the positioning the respective stiffener charge, loading, with the loading tool, the respective stiffener charge and the respective filler structure onto an inner mold line layup mandrel, wherein the inner mold line layup mandrel includes a plurality of stiffener forms, and wherein the loading includes conforming the respective stiffener charge to a respective stiffener form of the plurality of stiffener forms to form a respective stiffener with a respective stiffener cavity and with the respective filler structure being positioned within the respective stiffener cavity; and repeating the positioning the respective filler structure, the positioning the respective stiffener charge, and the loading to load a plurality of stiffeners and a plurality of filler structures onto the inner mold line layup mandrel.

Some methods according to the present disclosure include providing a supply of stiffeners, wherein each stiffener defines a stiffener cavity; providing a supply of filler structures; positioning a respective filler structure from the supply of filler structures on an upper side of a loading tool; positioning a respective stiffener from the supply of stiffeners on an upper side of the respective filler structure so that the respective filler structure is positioned within a respective stiffener cavity of the respective stiffener; following the positioning the respective filler structure and the positioning the respective stiffener, loading, with the loading tool, the respective stiffener and the respective filler structure onto an inner mold line layup mandrel, wherein the inner mold line layup mandrel includes a plurality of stiffener forms, and wherein the loading includes positioning the respective stiffener and the respective filler structure within a respective stiffener form of the plurality of stiffener forms; and repeating the positioning the respective filler structure, the positioning the respective stiffener, and the loading to load a plurality of stiffeners and a plurality of filler structures onto the inner mold line layup mandrel.

Some systems according to the present disclosure include a supply of stiffeners; a supply of filler structures; an inner mold line layup mandrel; and a filler location tool configured to locate a respective filler structure from the supply of filler structures within a respective stiffener cavity of a respective stiffener that is loaded onto the inner mold line layup mandrel.

Some systems according to the present disclosure include a supply of stiffener charges; a supply of filler structures; an inner mold line layup mandrel, wherein the inner mold line layup mandrel includes a plurality of stiffener forms; and a loading tool configured to receive a respective filler structure from the supply of filler structures on an upper side of the loading tool and a respective stiffener charge on an upper side of the respective filler structure, and to operatively load the respective stiffener charge and the respective filler structure onto the inner mold line layup mandrel so that the respective stiffener charge conforms to a respective stiffener form of the plurality of stiffener forms to define a respective stiffener with a respective stiffener cavity and so that the respective filler structure is positioned within the respective stiffener cavity.

Some systems according to the present disclosure include a supply of stiffeners, wherein each stiffener defines a stiffener cavity; a supply of filler structures, wherein each filler structure is configured to be positioned within a stiffener cavity; an inner mold line layup mandrel, wherein the inner mold line layup mandrel includes a plurality of stiffener forms; and a loading tool configured to receive a respective filler structure from the supply of filler structures on an upper side of the loading tool and a respective stiffener on an upper side of the respective filler structure, and to operatively load the respective stiffener and the respective filler structure onto the inner mold line layup mandrel so that the respective stiffener and the respective filler structure are positioned within a respective stiffener form of the plurality of stiffener forms.

DESCRIPTION

Figure 1:
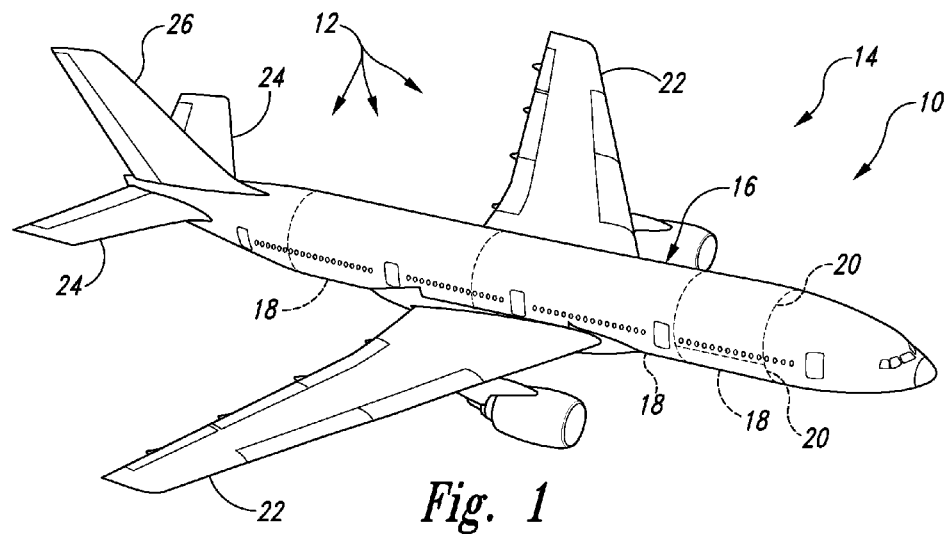
FIG. 1 is a perspective view of an illustrative, non-exclusive example of a stiffened composite structure in the form of an aircraft.

Methods and systems for assembling stiffened composite structures, as well as stiffened composite structures themselves and apparatuses constructed of stiffened composite structures, are disclosed herein. In FIG. 1, an example of an apparatus 10 that may be constructed from stiffened composite structures 12 is provided in the form of an aircraft 14; however, other apparatuses 10 are within the scope of the present disclosure, and the present disclosure is not limited to aircraft and aircraft applications. For example, as illustrative, non-exclusive examples, other apparatuses 10 that may be constructed of stiffened composite structures 12 include (but are not limited to) spacecraft, watercraft, land vehicles, wind turbines, structural towers and masts, etc. Moreover, aircraft 14 may take any suitable form, including commercial aircraft, military aircraft, private aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) helicopters.

Aircraft 14 include a fuselage 16, which generally corresponds to the main body of the aircraft 14 for holding passengers, crew, cargo, and/or equipment, for example, depending on the particular configuration and/or function of an aircraft 14. Typically, although not required, the fuselage 16 of an aircraft 14 is elongate and somewhat cylindrical or tubular. In some embodiments, the fuselage 16 may be constructed of multiple sections 18 that are longitudinally spaced along the fuselage 16 and operatively coupled together to define the fuselage 16. As used herein when referencing an aircraft 14, a fuselage 16, and/or a corresponding stiffened composite structure 12, the longitudinal direction refers to the fore-aft direction, corresponding to a longitudinal, or long, axis, of the fuselage 16. Additionally, the terms "inner" and "outer" when used in connection with an aircraft 14, a fuselage 16, and/or a corresponding stiffened composite structure 12 refer to the radially inward side and the radially outward side, respectively, of the corresponding stiffened composite structure. Accordingly, the outer side of a fuselage 16 or a component part thereof generally faces away from the fuselage 16, and the inner side of a fuselage 16 or a component part thereof generally faces the internal volume that is defined by the fuselage 16. Similar relative terms may be used with respect to stiffened composite structures 12 other than fuselages 16 and with respect to apparatuses 10 other than aircraft 14.

In FIG. 1, three fuselage sections 18 are indicated schematically; however, any number or size and shape of sections 18 may be used to construct a fuselage 16. Sections 18 additionally or alternatively may be referred to as barrel sections 18 of a fuselage 16, with each barrel section 18 generally defining a length of the fuselage 16. Additionally or alternatively, as schematically illustrated in FIG. 1, a section 18 may include, or be constructed of, more than one subsection 20. In the schematically illustrated and optional example of FIG. 1, a section 18 is shown schematically and optionally to include an upper subsection 20 and a lower subsection 20; however, a section 18 may be constructed of any suitable number, configuration, and placement of subsections 20, including no subsections 20 at all.

Aircraft 14 also may include wings 22, horizontal stabilizers 24, and a vertical stabilizer 26, each of which may be constructed as a unitary structure or in subsections that are subsequently assembled together. One or more of a fuselage 16, a fuselage section 18, a fuselage subsection 20, a wing 22, a horizontal stabilizer 24, a vertical stabilizer 26, or a structural subsection thereof may be constructed of and/or may be described as a stiffened composite structure 12 according to the present disclosure.

Figure 2:
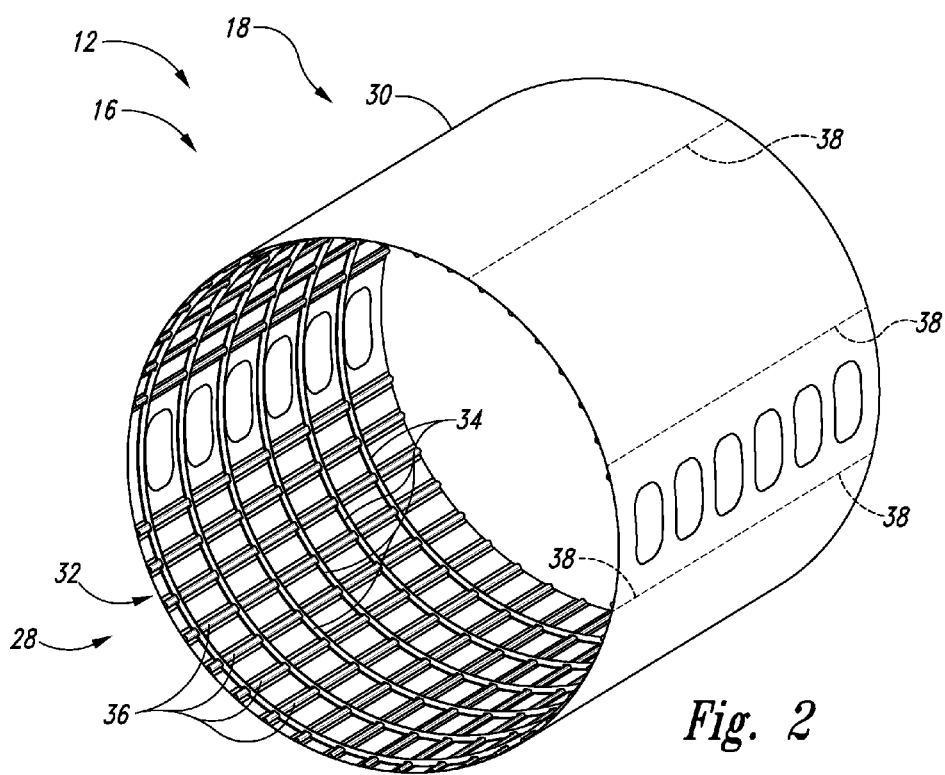
FIG. 2 is an isometric view of an illustrative, non-exclusive example of a stiffened composite structure in the form of a barrel section of an aircraft.

Stiffened composite structures 12 according to the present disclosure generally encompass structures that are defined by a structural frame 28 and a skin 30 that is operatively coupled to and supported by the structural frame 28. FIG. 2 depicts an illustrative, non-exclusive example of a stiffened composite structure 12 in the form of a barrel section 18 of a fuselage 16 of an aircraft 14. The skin 30 may be described as defining the outer shape of the fuselage 16. As indicated in FIG. 2, structural frames 28 include a plurality of stiffeners 32 operatively coupled to the inner side of the skin 30. In the example of fuselage 16, the stiffeners 32 include a plurality of frame members, or frames, 34 that are operatively coupled to and that extend circumferentially around the inner side of the skin 30 and that are spaced longitudinally along the fuselage 16. The stiffeners 32 also include a plurality of stringers 36 that are operatively coupled to and that extend longitudinally along the inner side of the skin 30 and that are spaced circumferentially around the fuselage 16. In some embodiments of stiffened composite structures 12, although not required, the skin 30 may be constructed of a plurality of skin segments 38 that collectively define the skin 30, or at least a portion of the skin 30 of a stiffened composite structure 12.

FIGS. 3-21 provide schematic representations of various systems 100 and methods 200 for assembling composite structures 12.

Figure 3:
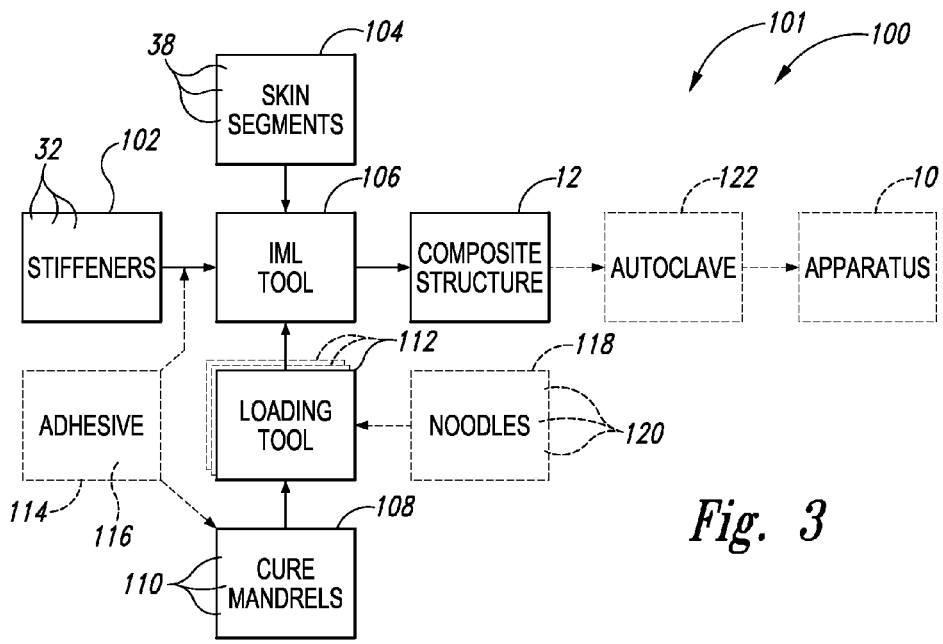
FIG. 3 is a schematic diagram representing systems for assembling stiffened composite structures.
Figure 4:
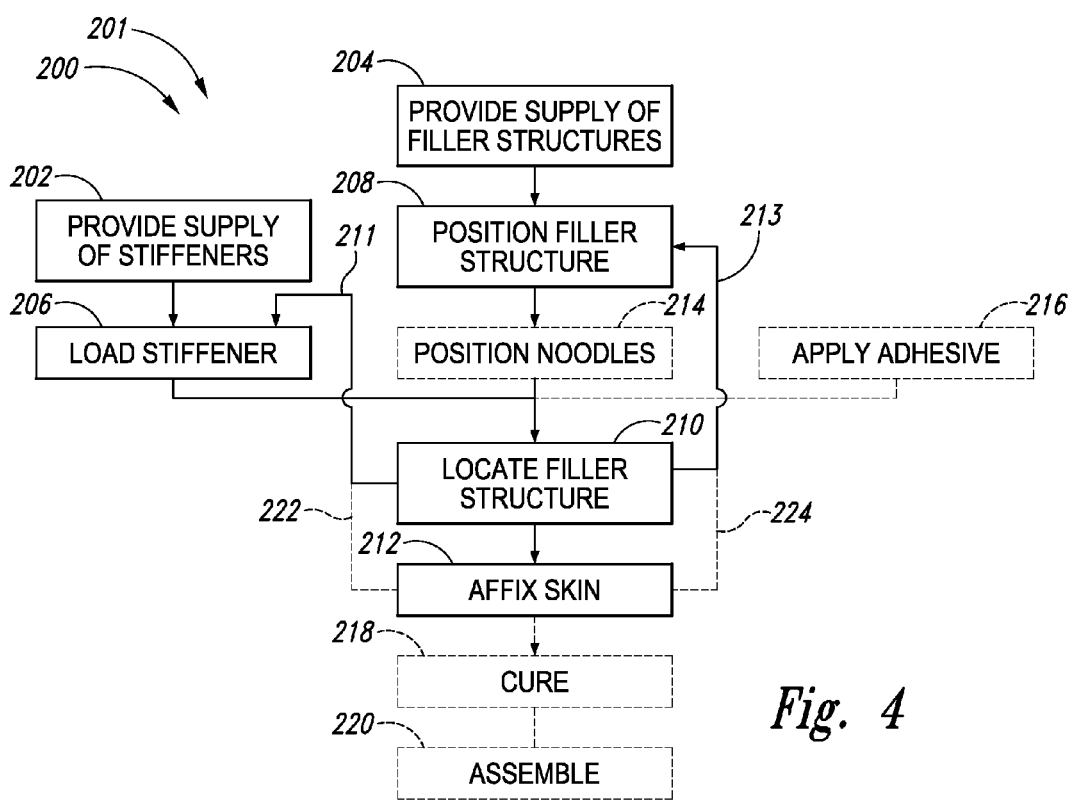
FIG. 4 is a flowchart schematically representing methods of assembling stiffened composite structures.

With reference first to FIGS. 3-9, FIG. 3 provides a schematic representation of illustrative, non-exclusive examples of systems 100 for assembling composite structures 12, indicated and referred to herein as systems 101; FIG. 4 provides a flowchart schematically representing illustrative, non-exclusive examples of methods 200 for assembling composite structures 12, indicated and referred to herein as methods 201; and FIGS. 5-9 provide somewhat less schematic but still non-exclusive examples of component parts of systems 100, including example systems 101, such as that perform and/or are utilized in connection with the performance of one or more steps of methods 200, including example methods 201. FIG. 3 additionally or alternatively may be described as schematically representing, or illustrating, the flow of materials through a manufacturing facility, with the flow of materials ultimately resulting in a stiffened composite structure 12, and optionally resulting in a fully assembled apparatus 10. In FIGS. 3-9, some elements are illustrated in dashed lines, schematically representing that such elements may be optional or may correspond to an optional version of a system 101 and/or method 201. That said, not all systems 101 and methods 201 are required to include the elements illustrated in solid lines. The schematic representation of systems 101 and methods 201 in FIGS. 3-9 are not limiting and other systems 101, component parts of systems 101, methods 201, and steps of methods 201 are within the scope of the present disclosure, including systems 101 having greater than or fewer than the number of illustrated elements, as well as methods 201 having greater than or fewer than the number of illustrated steps, as understood from the discussions herein. As also understood from the discussions herein, methods 201 are not required to have the schematically represented steps of FIG. 4 performed in the order illustrated.

With initial reference to FIG. 3, a system 101 may include a supply 102 of stiffeners 32, a supply 104 of skin segments 38, an inner mold line layup mandrel 106, a supply 108 of filler structures 110, and a loading tool 112. Additionally, in some embodiments, a system 101 further may include a supply 114 of adhesive 116, a supply 118 of radius fillers, or noodles, 120, and/or a curing oven or autoclave 122.

With reference to FIGS. 5-9, which represent illustrative, non-exclusive examples of component parts of a system 101, a filler structure 110 is a structure that is configured to be located, or positioned, within a cavity 40 that is defined by a stiffener 32, so that a skin segment 38 operatively may be affixed to a plurality of stiffeners 32 that are loaded on the inner mold line layup mandrel 106. For example, in the schematically illustrated example, the stiffeners 32 are hat-shaped stringers 36 that each defines a stiffener cavity 40 for location of a corresponding filler structure 110, and with each stringer including opposing flanges 150 extending longitudinally along the length of the stringers and outside of a respective stiffener form 130 of the inner mold line layup mandrel 106. However, hat-shaped stringers and flanged stringers are not required, and any suitable configuration of stiffeners, including flangeless stringers, such as flangeless hat-shaped stringers, may be used with and/or in conjunction with systems 100 and methods 200.

Figure 5:
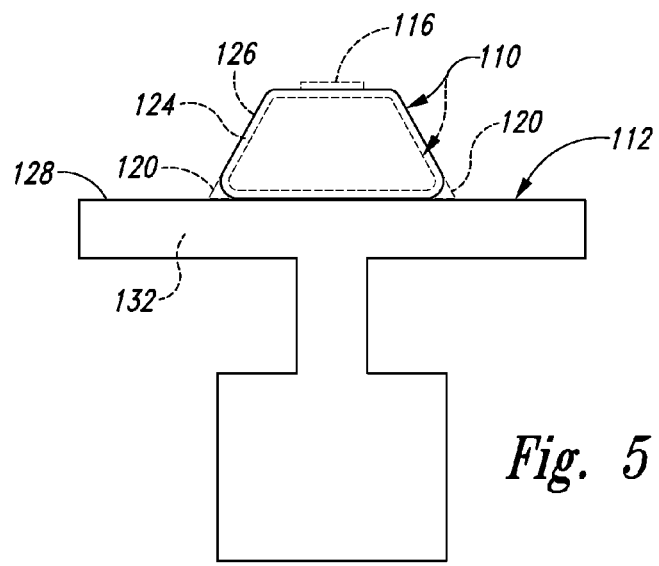
FIG. 5 is a schematic end view representing a loading tool, together with a filler structure and optional noodles.

In some systems 100, a loading tool 112 may be described as a filler location tool 112, because it is a tool that is configured to locate, or position, a respective filler structure 110 from the supply 108 of filler structures 110 within a respective stiffener cavity 40 of a respective stiffener 32 that is loaded onto the inner mold line layup mandrel 106. Filler structures 110 additionally or alternatively may be described as mandrels, stringer mandrels, cure mandrels, stringer cure mandrels, bladders, stringer bladders, and/or stringer cure bladders 110. Typically, although not required, filler structures 110 are constructed of rubber or a rubber-like material and in some applications may include a breather sock 124 extending over the filler structure's body, and filler release material 126 extending over the breather sock 124, as schematically represented in FIG. 5.

Adhesive 116, when utilized, may take any suitable form, and may be configured to operatively affix filler structures 110 within the cavities 40 of stiffeners 32. A curing oven or autoclave 122 is a tool that is configured to receive a stiffened composite structure 12, or portion thereof, and to cure the stiffened composite structure 12, or portion thereof.

Some embodiments of stiffened composite structures 12, including the skin 30 and the stiffeners 32, may be constructed of fiber reinforced composite material. Fiber reinforced composite materials additionally or alternatively may be described as or referred to as fiber reinforced polymers, or plastics. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers. In some embodiments, the fibers may be woven into a fabric. In some embodiments, the skin 30 and/or the stiffeners 32 may be constructed of multiple layers, or plies, of fiber reinforced composite material. In some such embodiments, the plies may be pre-preg plies, which are layers, or sheets, of fibers that are pre-impregnated with the associated binding material. Accordingly, multiple pre-preg plies may be layered to collectively define a segment of fiber reinforced composite material having desired properties and characteristics. The binding material of pre-preg plies may be partially cured, or pre-cured, so as to permit handling of the plies and selective assembly of the plies. Typically, partially cured pre-preg plies are tacky to the touch and therefore easily stick together when layered, but not necessarily in a permanent fashion. That is, when layered, two adjacent plies may be permitted to translate laterally relative to each other and/or may be able to be separated, if so desired. To more permanently affix adjacent layers of plies together, the layered plies may be compacted, or compressed, together, utilizing any suitable method and at any suitable and various times during the construction of a fiber reinforced composite structure. This compression of two or more layers is referred to as compaction, or as compacting, of the plies. The term "compacting" also may be used to describe the adhering, mounting, or otherwise affixing of a tool, such as a filler structure 110, to a composite structure 12, such as a stiffener 32.

Turning now to FIG. 4, but with continued reference to FIG. 3 and FIGS. 5-9, a method 201 of assembling a stiffened composite structure 12 may include providing a supply 102 of stiffeners 32, as indicated at 202; providing a supply 108 of filler structures 110, as indicated at 204; loading a respective stiffener 32 from the supply 102 of stiffeners 32 onto the inner mold line layup mandrel 106, as indicated at 206; positioning a respective filler structure 110 from the supply 108 of filler structures 110 on an upper side 128 of a loading tool 112, as indicated at 208; and then following the loading 206 and the positioning 208, locating, with the loading tool 112, the respective filler structure 110 within the stiffener cavity 40 of the respective stiffener 32, as indicated at 210. Then, as schematically indicated in FIG. 4 at 211, the loading 206 is repeated with a subsequent stiffener 32, and, as schematically indicated at 213, the positioning 208 and locating 210 also are repeated with a subsequent filler structure 110, so that a plurality of stiffeners 32 become loaded on the inner mold line layup mandrel 106 and a plurality of filler structures 110 are located within the stiffener cavities 40 of the plurality of loaded stiffeners 32. Next, following the repeating 211 and 213, a skin segment 38 is affixed over the plurality of filler structures 110 and to the plurality of stiffeners 32 that are loaded onto the inner mold line layup mandrel 106, as indicated at 212, resulting in at least a portion of a stiffened composite structure 12 being formed on the inner mold line layup mandrel 106.

In some systems 100 and methods 200, rather than optionally affixing a discrete skin segment 38 over a plurality of stiffeners 32 and filler structures 110, a skin 30 may be built up on the inner mold line layup mandrel 106, for example, using automated fiber placement. Automated fiber placement, which additionally or alternatively may be described as advanced fiber placement, typically utilizes the automated placement of a bundle, or tow, of carbon fibers impregnated with epoxy resin by an automated placement machine in a predefined orientation and configuration on a layup mandrel. As used herein, the affixing 212 of a skin segment includes optionally utilizing automated fiber placement to build-up a skin 30 on the inner mold line layup mandrel 106.

Figure 6:
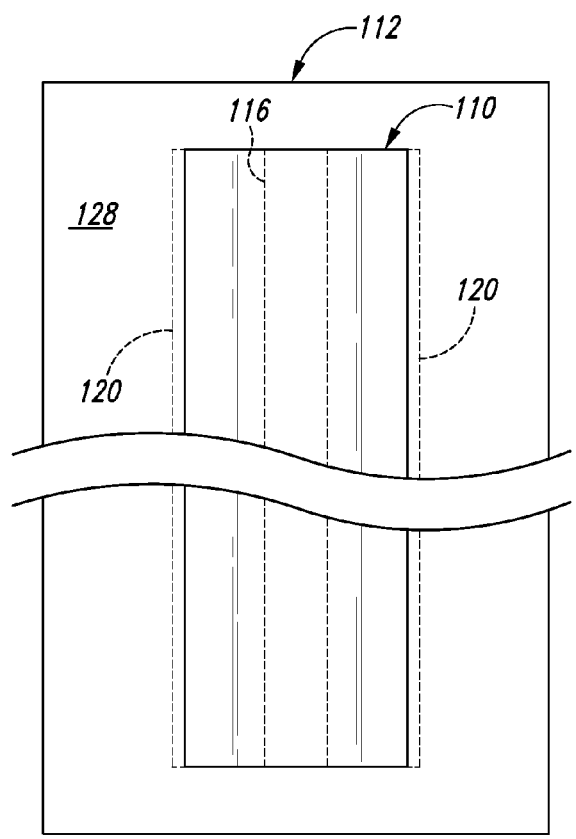
FIG. 6 is a schematic top view of the loading tool, filler structure, and optional noodles of FIG. 5.
Figure 7:
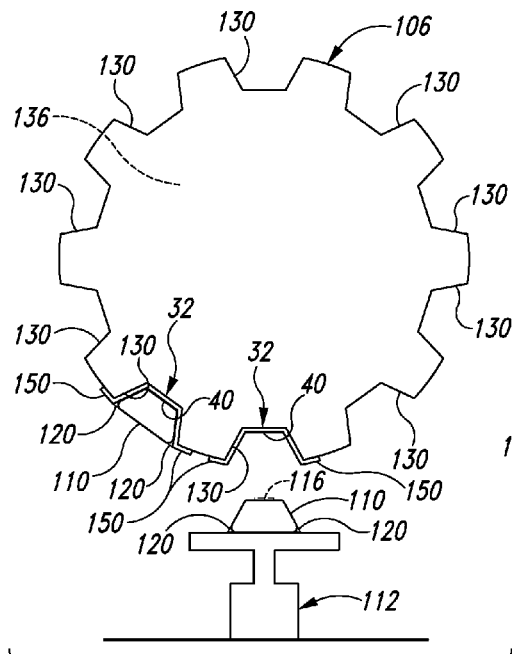
FIG. 7 is a schematic end view of the loading tool, filler structure, and optional noodles of FIGS. 5-6, positioned underneath an inner mold line layup mandrel and loaded stiffener for locating of the filler structure and noodles within the respective stiffener cavity.
Figure 8:
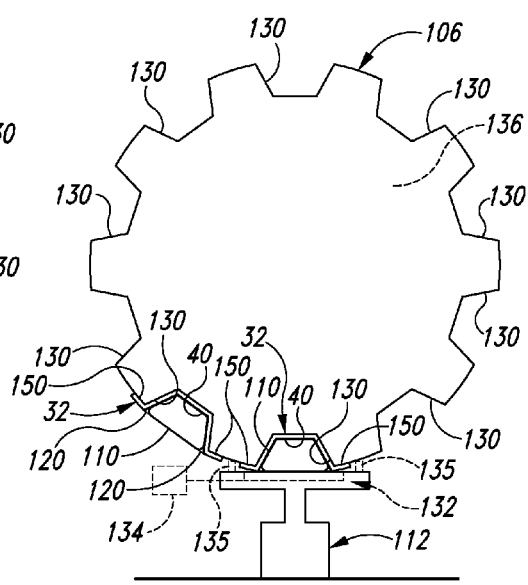
FIG. 8 is another schematic end view of the loading tool, filler structure, optional noodles, inner mold line layup mandrel, and stiffener of FIG. 7, showing operative location and optional compaction of the filler structure and noodles within the stiffener cavity.

FIGS. 5-6 schematically illustrate a filler structure 110 operatively positioned on the upper surface 128 of the loading tool 112. FIGS. 7-8 schematically illustrate two stiffeners 32 loaded on the inner mold line layup mandrel 106, with one filler structure 110 having already been located within the cavity 40 of one of the loaded stiffeners 32. In FIG. 7, the loading tool 112 is operatively positioned underneath the inner mold line layup mandrel 106 so that a second filler structure 110 may be appropriately located within the cavity 40 of a second stiffener 32. In FIG. 8, the loading tool 112 has raised the filler structure 110 into the cavity 40 of the second stiffener 32. Accordingly, in some methods 200, the locating 210 may be described as including positioning the loading tool 112 vertically underneath the inner mold line layup mandrel 106, and raising the respective filler structure 110 with the loading tool 112. While FIGS. 7-8 schematically illustrate the loading of filler structures 110 from underneath the inner mold line layup mandrel 106, such a configuration is not required in all systems 100 and methods 200, and it is within the scope of the present disclosure, including with respect to systems 101 and methods 201, that a loading tool 112 may be configured to operatively load a filler structure 110 from any suitable orientation relative to the inner mold line layup mandrel 106. For example, a loading tool 112 may be configured to load a filler structure 110 onto any suitable location on the inner mold line layup mandrel 106, including locations that are at an angle relative to the horizontal, and including locations on the bottom half of the inner mold line layup mandrel 106, as well as locations on the upper half of the inner mold line layup mandrel 106.

Figure 9:
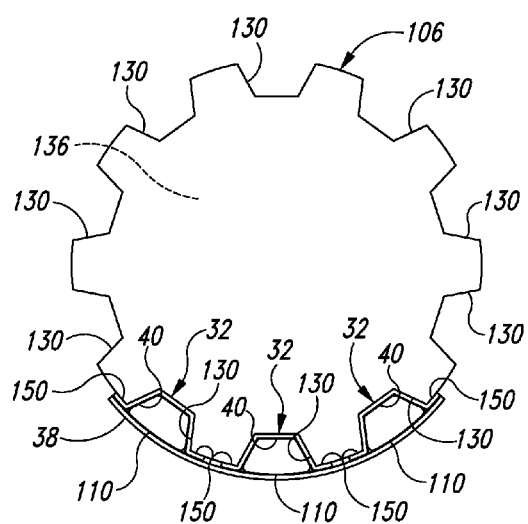
FIG. 9 is a schematic end view of an inner mold line layup mandrel with a plurality of stiffeners and a skin segment loaded thereon, together with corresponding filler structures located within the stiffener cavities.

In the illustrated example of FIGS. 7-9, an illustrative, non-exclusive example of an inner mold line layup mandrel 106 is presented schematically and is generally cylindrical, corresponding to a generally cylindrical stiffened composite structure 12 that includes a plurality of hat-shaped stiffeners 32 in the form of stringers 36 that extend longitudinally along and that are spaced circumferentially around the stiffened composite structure 12; however, as discussed herein, other configurations of stiffened composite structures 12, and thus of corresponding systems 100 and component parts thereof, are within the scope of the present disclosure. With reference to the illustrative, non-exclusive schematic example of FIGS. 7-9, an inner mold line layup mandrel 106 may be described as including a plurality of spaced-apart stiffener forms 130, with each stiffener form 130 having an outer surface that corresponds to one side of a respective stiffener 32 that is to be loaded into a respective stiffener form 130. Accordingly, in some methods 201, the loading 206 may include loading a stiffener 32 onto, or within, a respective stiffener form 130.

The schematic representation of the inner mold line layup mandrel 106 is not illustrated to scale, and as an illustrative, non-exclusive example, an inner mold line layup mandrel 106 that is configured for assembly of fuselages 16 may include more than 20, more than 50, more than 75, or even more than 100 stiffener forms 130 corresponding to a plurality of stringers 36.

As indicated at 214 in FIG. 4, some methods 201 optionally further include prior to the locating 210, positioning a noodle or noodles 120 along the longitudinal edges of the filler structure 110 to be located. The placement of optional noodles 120 also is schematically illustrated in FIGS. 5-6 on the upper surface 128 of the loading tool 112. It also is within the scope of the present disclosure that the operative positioning of noodles 120 may occur after the respective filler structure 110 has been located within the cavity 40 of a stiffener 32 on the inner mold line layup mandrel 106. Additionally or alternatively, in some methods 201, the positioning 208 of a filler structure 110 may be described as including the positioning 214 of noodles 120. Additionally or alternatively, in some systems 100 and methods 200, the noodles 120 may be considered a component part of a filler structure 110. That is, a filler structure 110 may include noodles 120. Moreover, it is within the scope of the present disclosure that a filler structure 110 be suitably shaped, or otherwise configured, so that no noodles 120 are required.

Some methods 201 optionally include prior to the locating 210, applying an adhesive 116 to an upper side of the filler structure 110, as indicated in FIG. 4 at 216. Accordingly, the locating 210 may be described as including adhering the filler structure 110 within the stiffener cavity 40 of the respective stiffener 32. In some systems 100 and methods 200, the adhesive 116 may take the form of an adhesive strip, such as schematically illustrated in FIGS. 5-7.

Additionally or alternatively, as schematically and optionally represented in FIG. 3, in some systems 101 and methods 201, the adhesive 116 may be applied to the cavity 40 of a stiffener 32 that is loaded or to be loaded on the inner mold line layup mandrel 106.

In some methods 201, the locating 210 may include compacting a located filler structure 110 within the cavity 40 of the respective stiffener 32. That is, in some systems 100, the loading tool 112 may include compaction structure 132 that is configured to compact an associated filler structure 110 within the cavity 40 of the respective stiffener 32. For example, in embodiments in which the loading tool 112 is configured to raise the filler structure 110, the compaction structure 132 simply may impart a compaction force to the filler structure 110, which in turn imparts a compaction force to the stiffener 32. When an adhesive 116 is used, this compaction force may ensure the adhesion of the filler structure 110 within the stiffener cavity 40. Alternatively, the compaction structure 132 may be configured to vacuum compact the filler structure 110 within the stiffener cavity 40. In FIG. 8, the optional compaction structure 132 is schematically illustrated as including a vacuum system 134 and a seal 135. With the seal 135 operatively engaged with the inner mold line layup mandrel 106, the vacuum system 134 operatively draws air from the interface between the loading tool 112 and the inner mold line layup mandrel 106. Accordingly, when activated, the vacuum system 134 operatively may suction the filler structure 110 within the stiffener cavity 40, resulting in the compaction of the filler structure 110 and optionally also of the stiffener 32. In some such systems 101 and methods 201, the loading tool 112 may raise the filler structure 110 to a position that is spaced away from engagement with the stiffener 32, and then the vacuum compacting may operatively suction the filler structure 110 within the stiffener cavity 40. The optional compaction structure 132 may include any suitable structures and/or tools and be configured to perform any suitable methods as those disclosed in, and/or modified from those disclosed in, co-owned U.S. patent application Ser. No. 13/769,022 filed on Feb. 15, 2013 and entitled SYSTEMS AND METHODS FOR COMPACTING A CHARGE OF COMPOSITE MATERIAL, the complete disclosure of which is incorporated herein by reference.

Some methods 201 optionally include rotating the inner mold line layup mandrel 106 to position the inner mold line layup mandrel 106 after the loading 206 and the locating 210 for subsequent loading of a subsequent stiffener 32 and locating of a subsequent filler structure 110. FIGS. 7-8 schematically represent the locating of a subsequent filler structure 110 after an initial stiffener 32 has been loaded and a corresponding initial filler structure 110 has been located within the initial stiffener cavity 40, and thus after the inner mold line layup mandrel 106 has been rotated. Accordingly, in some systems 100, the inner mold line layup mandrel 106 may be described as including a rotation structure 136 that is configured to rotate the inner mold line layup mandrel 106 after each loading 206 of a stiffener 32 and locating 210 of a filler structure 110.

The loading 206 of stiffeners 32 may be performed utilizing any suitable structures, tools, and methods, including (but not limited to) those disclosed in, and/or modified from those disclosed in, co-owned U.S. patent application Ser. No. 13/732,961 filed on Jan. 2, 2013 and entitled SYSTEMS AND METHODS FOR ASSEMBLING STIFFENED COMPOSITE STRUCTURES, the complete disclosure of which is incorporated herein by reference. Similarly, the affixing 212 of skin segments 38 may be performed utilizing any suitable structures, tools, and methods, including (but not limited to) those disclosed in, and/or modified from those disclosed in, co-owned U.S. patent application Ser. No. 13/693,887 filed on Dec. 4, 2012 and entitled SYSTEMS AND METHODS FOR ASSEMBLING A SKIN OF A COMPOSITE STRUCTURE, co-owned U.S. patent application Ser. No. 13/886,976 filed on May 3, 2013 and entitled SYSTEMS AND METHODS OF FORMING A SKIN FOR A COMPOSITE STRUCTURE AND COMPOSITE STRUCTURES INCLUDING THE SAME, and co-owned U.S. patent application Ser. No. 13/887,006 filed on May 3, 2013 and entitled FLEXIBLE MATERIAL TRANSFER DEVICES, FLEXIBLE VACUUM COMPACTION DEVICES, FLEXIBLE VACUUM CHUCKS, AND SYSTEMS AND METHODS INCLUDING THE SAME, the complete disclosures of which are incorporated herein by reference. Similarly, the optional compacting of the filler structure 110 may be performed utilizing any suitable structures, tools, and methods, including (but not limited to) those disclosed in, and/or modified from those disclosed in, co-owned U.S. patent application Ser. No. 13/769,022, previously incorporated herein by reference.

As schematically illustrated in the flowchart of FIG. 4, the loading 206 and the positioning 208 may be performed parallel to, or concurrently with, each other during the assembly of a stiffened composite structure 12. For example, while a first stiffener 32 is being loaded onto the inner mold line layup mandrel 106, a filler structure 110 may be appropriately positioned on a loading tool 112. The filler structure 110 that is being positioned at the same time as the loading of a stiffener 32 may or may not be the filler structure 110 that will be located in that stiffener 32. For example, it is within the scope of the present disclosure that a system 100 includes more than one loading tool 112, as well as more than one tool that is configured to load stiffeners 32. As a result, an efficient assembly of a stiffened composite structure 12 may be realized.

As optionally and schematically indicated in FIG. 4 at 218, some methods 201 further may include following the affixing 212, curing the stiffened composite structure 12, for example, in a curing oven or autoclave 122 of a system 100.

As discussed, some apparatuses 10 may include several stiffened composite structures 12 that are assembled together to collectively define the apparatus 10 or a greater stiffened composite structure 12. Aircraft 14 and fuselages 16 are such examples, with an illustrative, non-exclusive example of a fuselage 16 having more than one barrel section 18. Accordingly, as optionally and schematically indicated in FIG. 4, some methods 201 further may include following the affixing, again repeating the loading 206, as indicated at 222, and the positioning 208 and locating 210, as indicated at 224, as many times as necessary to form another portion of a stiffened composite structure 12. Following the formation of multiple formed portions of a stiffened composite structure 12, the multiple formed portions may be assembled together, as indicated at 220. Depending on the size of the stiffened composite structure 12 and/or the portions thereof, each portion may be cured prior to final assembly, or multiple portions may first be assembled and then the entire assembly may be cured.

Figure 10:
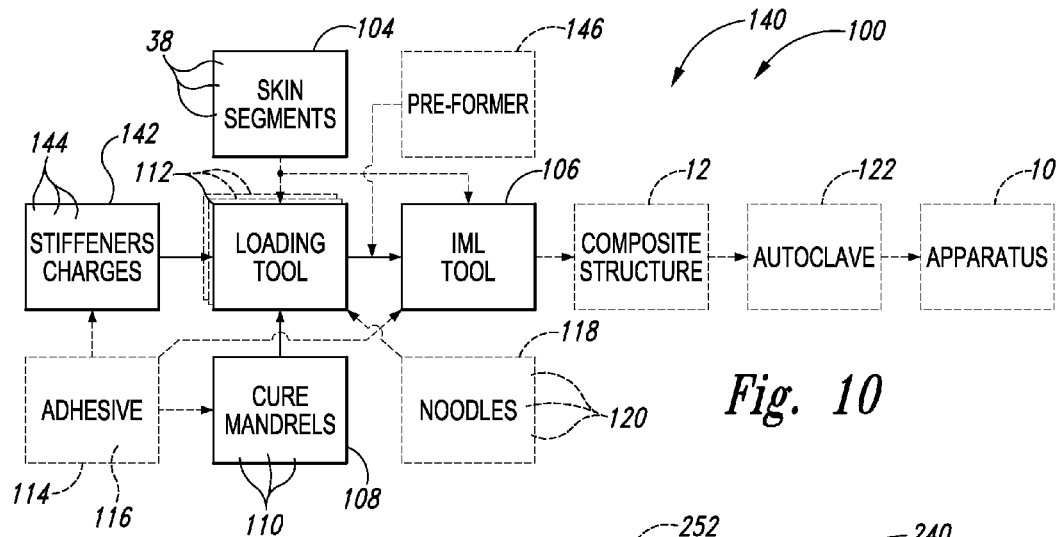
FIG. 10 is a schematic diagram representing systems for assembling stiffened composite structures.
Figure 11:
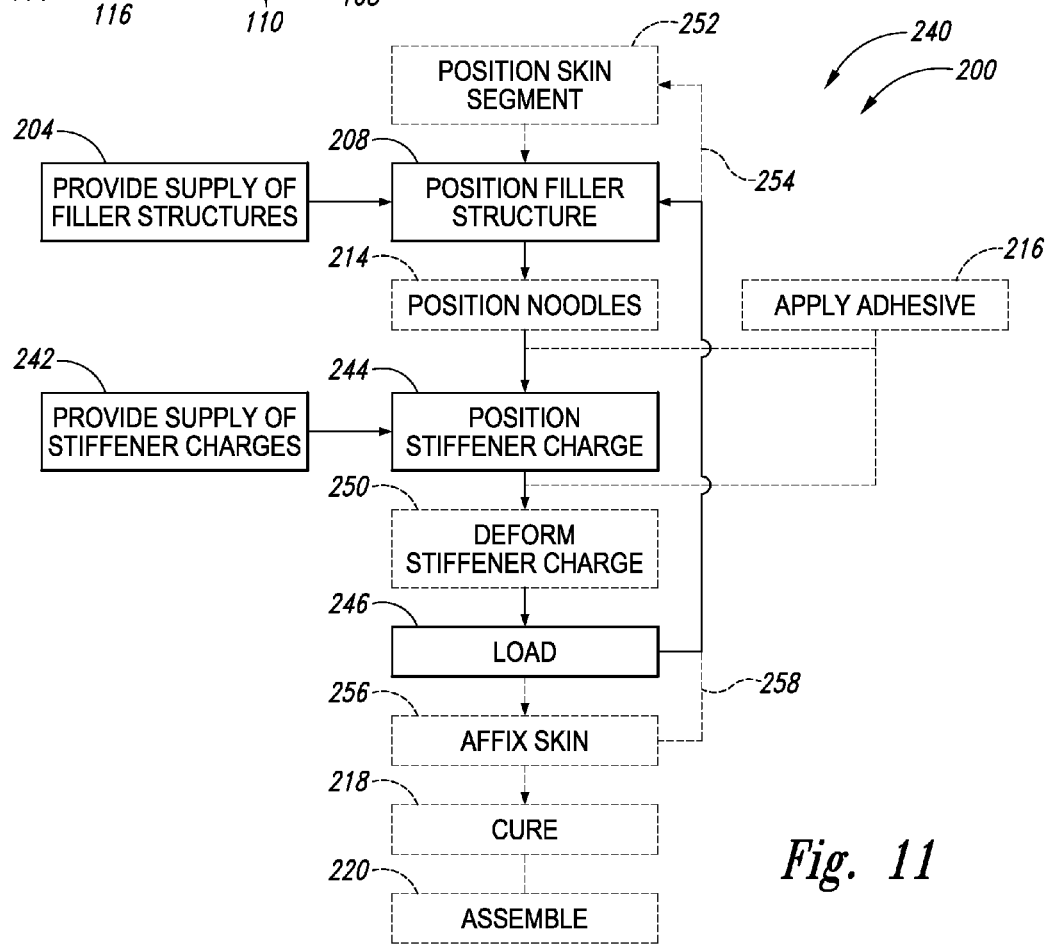
FIG. 11 is a flowchart schematically representing methods of assembling stiffened composite structures.

Turning now to FIGS. 10-17, FIG. 10 provides a schematic representation of additional illustrative, non-exclusive examples of systems 100 for assembling composite structures 12, indicated and referred to herein as systems 140; FIG. 11 provides a flowchart schematically representing additional illustrative, non-exclusive examples of methods 200 for assembling composite structures 12, indicated and referred to herein as methods 240; and FIGS. 12-17 provide somewhat less schematic but still non-exclusive examples of component parts of systems 100, including example systems 140, such as that perform and/or are utilized in connection with the performance of one or more steps of methods 200, including example methods 240. Systems 140 and methods 240 may be described as variations on systems 101 and methods 202. More specifically, example systems 101 and example methods 201 involve the loading of a stiffener 32 on to an inner mold line layup mandrel 106 prior to the locating of a filler structure 110 within the cavity 40 of a loaded stiffener 32, whereas systems 140 and methods 240 involve the loading of a stiffener 32 and a corresponding filler structure 110 together on an inner mold line layup mandrel 106.

Similar to FIG. 3, FIG. 10 additionally or alternatively may be described as schematically representing, or illustrating, the flow of material through a manufacturing facility, with the flow of materials ultimately resulting in a stiffened composite structure 12, and optionally resulting in a fully assembled apparatus 10. In FIGS. 10-17, some elements are illustrated in dashed lines, schematically representing that such elements may be optional or may correspond to an optional version of a system 140 and/or method 240. That said, not all systems 140 and methods 240 are required to include the elements illustrated in solid lines. The schematic representation of systems 140 and methods 240 in FIGS. 10-17 are not limiting and other systems 140, component parts of systems 140, methods 240, and steps of methods 240 are within the scope of the present disclosure, including systems 140 having greater than or fewer than the number of illustrated elements, as well as methods 240 having greater than or fewer than the number of illustrated steps, as understood from the discussions herein. As also understood from the discussions herein, methods 240 are not required to have the schematically represented steps of FIG. 11 performed in the order illustrated.

In FIGS. 10-17, like reference numerals are used to designate like elements of systems 100 and methods 200, and not all elements may be discussed fully again if already discussed with respect to systems 101 and methods 201, for example. However, like elements may include any of the various features, characteristics, aspects, functions, structures, etc. previously discussed with respect to such elements.

With reference first to FIG. 10, a system 140 may include a supply 142 of stiffener charges 144, an inner mold line layup mandrel 106, a supply 108 of filler structures 110, and a loading tool 112. Additionally, in some embodiments, a system 140 further may include a supply 104 of skin segments 38, a supply 114 of adhesive 116, a supply 118 of radius fillers, or noodles, 120, a preforming tool 146, and/or a curing oven or autoclave 122.

With reference to FIGS. 12-16, which represent illustrative, non-exclusive examples of component parts of a system 140, a stiffener charge 144 is a pliable blank of material that is configured to form a stiffener 32. Typically, although not required, a stiffener charge 144 is constructed of a sheet of material or materials, which may have a generally uniform thickness or may have areas of varying thickness, such as corresponding to desired properties and characteristics of a stiffener 32 to be formed from the stiffener charge 144. In examples of stiffeners 32 that are constructed of fiber reinforced material, a stiffener charge 144 may include multiple layers, or plies, of fiber reinforced composite materials, such as pre-preg plies; however, as discussed herein, stiffeners 32 and stiffener charges 144 are not limited to being constructed of pre-peg fiber reinforced composite materials.

Turning now to FIG. 11, but with continued reference to FIG. 10 and FIGS. 12-16, a method 240 of assembling a stiffened composite structure 12 may include providing a supply 108 of filler structures 110, as indicated at 204; providing a supply 142 of stiffener charges 144, as indicated at 242; positioning a respective filler structure 110 from the supply 108 of filler structures 110 on an upper side 128 of a loading tool 112, as indicated 208; positioning a respective stiffener charge 144 from the supply 142 of stiffener charges 144 on an upper side 148 of the respective filler structure 110, as indicated at 244; and then following the positioning 208 and the positioning 244, loading, with the loading tool 112, the respective stiffener charge 144 and the respective filler structure 110 onto an inner mold line layup mandrel 106, as indicated at 246. Then, as schematically indicated in FIG. 11 at 248, the positioning 208, the positioning 244, and the loading 246 are repeated to load a plurality of stiffeners 32 and a plurality of filler structures 110 onto the inner mold line layup mandrel 106.

Figure 12:
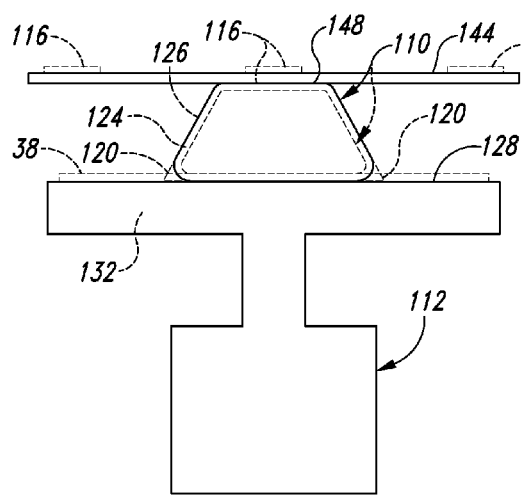
FIG. 12 is a schematic end view representing a loading tool, together with a filler structure positioned on the upper side of the loading tool and a stiffener charge positioned on the upper side of the filler structure.
Figure 14:
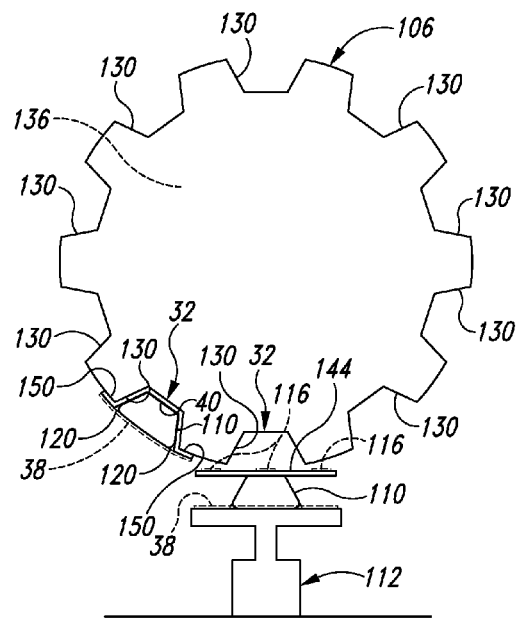
FIG. 14 is a schematic end view of the loading tool, filler structure, and stiffener charge of FIG. 12, positioned underneath an inner mold line layup mandrel for loading of the stiffener charge and the filler structure on the inner mold line layup mandrel.
Figure 15:
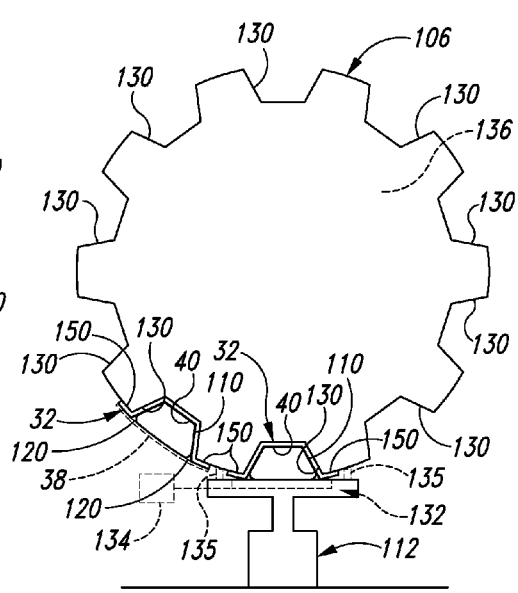
FIG. 15 is another schematic end view of the loading tool, filler structure, and stiffener charge of FIG. 12, showing operative loading and optional compaction of the stiffener charge and the filler structure on the inner mold line layup mandrel.

FIG. 12 schematically illustrates a filler structure 110 operatively positioned on the upper surface 128 of the loading tool 112 and a stiffener charge 144 operatively positioned on the upper surface 148 of the filler structure 110. FIGS. 14-15 schematically illustrate the loading 246 of a stiffener charge 144 and a corresponding filler structure 110 on to an inner mold line layup mandrel 106 with a loading tool 112, including one stiffener 32 and corresponding filler structure 110 already loaded on the inner mold line layup mandrel 106. In FIG. 14, the loading tool 112 is operatively positioned underneath the inner mold line layup mandrel 106 so that a second stiffener charge 144 and corresponding filler structure may be appropriately loaded onto the inner mold line layup mandrel 106. In FIG. 15, the loading tool 112 has raised the stiffener charge 144 and corresponding filler structure 110 into a stiffener form 130 of the inner mold line layup mandrel 106. Accordingly, the loading 246 of a method 240 may include conforming the respective stiffener charge 144 to a respective stiffener form 130 to form a respective stiffener 32 with a respective stiffener cavity 40 and with the respective filler structure 110 being positioned within the respective stiffener cavity 40.

Accordingly, the loading 246 of a method 240 actually forms the stiffener 32 from the stiffener charge 144, with the stiffener form 130 of the inner mold line layup mandrel 106 and the upper surface 148 of the filler structure 110 defining a mold in the desired shape of the stiffener 32. In the schematically illustrated example, the stiffeners 32 take the form of hat-shaped stiffeners with opposing flanges 150 extending longitudinally along the length of the stiffeners and being formed outside of a respective stiffener form 130 of the inner mold line layup mandrel 106. In such illustrative, non-exclusive examples of stiffeners 32, the upper surface 128 of the loading tool 112 further defines a mold with the upper surface 148 of the filler structure 110 and the stiffener form 130 in the hat-shaped configuration of the stiffener 32. However, as discussed herein, hat-shaped stringers and flanged stringers are not required to be used and/or formed in all systems 100 and methods 200, and any suitable configuration of stringers, including flangeless stringers may be used and/or formed.

While FIGS. 14-15 schematically illustrate the loading of filler structures 110 and stringers 32 from underneath the inner mold line layup mandrel 106, such a configuration is not required in all systems 100 and methods 200, and it is within the scope of the present disclosure, including with respect to systems 140 and methods 240, that a loading tool 112 may be configured to operatively load a filler structure 110 and stringer 32 from any suitable orientation relative to the inner mold line layup mandrel 106. For example, a loading tool 112 may be configured to load a filler structure 110 and stringer 32 onto any suitable location on the inner mold line layup mandrel 106, including locations that are at an angle relative to the horizontal, and including locations on the bottom half of the inner mold line layup mandrel 106, as well as locations on the upper half of the inner mold line layup mandrel 106.

As indicated at 250 in FIG. 11, some methods 240 optionally further include following the positioning 244 and prior to the loading 246, deforming the stiffener charge 144 at least partially over the upper surface 148 of the filler structure 110. By deforming at least partially over the upper surface 148 of the filler structure 110, it is meant that the stiffener charge 144 is operatively deformed, but not necessarily to the final configuration of a stiffener 32. For example, if the stiffener charge 144 initially was planar, the deforming 250 results in the stiffener charge 144 being contoured over the filler structure 110. Although the deforming 250 is not required in all methods 240, performing the deforming 250 may facilitate the transition of the stiffener charge 144 to the desired shaped of a stiffener 32 during the loading 246. For example, by deforming the stiffener charge 144 at least partially prior to the loading 246, the stiffener charge 144 may more easily be inserted within the stiffener form 130 of the inner mold line layup mandrel, for example, without the regions of the stiffener charge 144 that become the optional flanges 150 of the stiffener 32 unnecessarily impeding the molding of the stiffener charge within the stiffener form 130.

Figure 13:
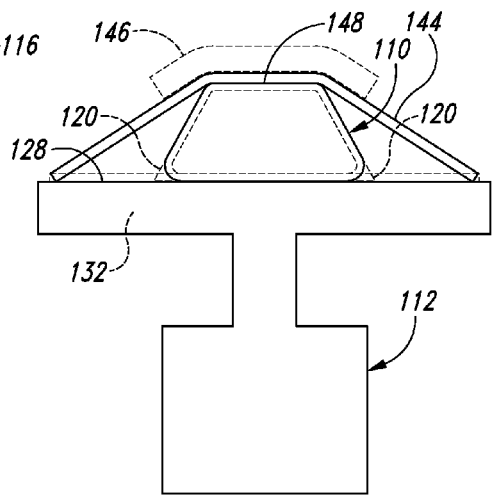
FIG. 13 is a schematic end view of the loading tool, filler structure, and stiffener charge of FIG. 12, shown with an optional preforming tool.

The optional deforming 250 may be accomplished in any suitable manner with any suitable tools. For example, the stiffener charge 144 simply may be deformed manually by an operator of a system 140, such as with his or her hands, pressing the stiffener charge 144 over the filler structure 110. Additionally or alternatively, an optional preforming tool 146 may be utilized that is configured to deform the stiffener charge 144 at least partially over the upper surface 148 of the filler structure 110 prior to the loading tool 112 operatively loading the stiffener charge 144 and the filler structure 110 onto the inner mold line layup mandrel 106. FIG. 13 schematically illustrates an optional preforming tool 146 of a system 140. When provided, a preforming tool 146 may take any suitable form and include any suitable structure that is configured to operatively deform a stiffener charge 144 at least partially over the upper surface 148 of a filler structure 110. For example, a preforming tool 146 may include one or more rollers that are configured to apply a downward pressure on a stiffener charge that is appropriately positioned on top of a filler structure and then operatively roll along at least a portion of the stiffener charge to at least partially conform the stiffener charge to the upper surface 148 of the filler structure. Additionally or alternatively, a preforming tool 146 may include a contoured plate that is operatively positioned over the stiffener charge 144 and that provides a downward pressure on the stiffener charge 144 to at least partially deform it to the upper surface 148 of the filler structure 110. Other preforming tools 146 also may be used.

As schematically represented in FIG. 10, a system 140 additionally may include a supply 104 of skin segments 38 for loading onto the inner mold line layup mandrel 106. In some methods 240, prior to the positioning 208 of a filler structure 110 on the upper surface 128 of the loading tool 112, a skin segment 38 first may be positioned on the upper side 128 of the loading tool, as schematically indicated in FIG. 11 at 252 and also schematically illustrated in FIGS. 12-14. In such example methods 240, the positioning 208 includes positioning the filler structure 110 on an upper side of the skin segment 38, and the loading 246 includes loading the skin segment 38 onto the inner mold line layup mandrel 106 over the filler structure 110 and the corresponding stiffener 32, as schematically illustrated in FIGS. 14-15 with the optional skin segment 38 loaded on the inner mold line layup mandrel 106 with the stiffener 32 and corresponding filler structure 110. Moreover, in such example methods 240, the repeating 248 also may include repeating the positioning 252, as schematically and optionally indicated in FIG. 11 at 254, so that a plurality of stiffeners 32, a plurality of filler structures 110, and a plurality of skin segments 38 are operatively loaded on the inner mold line layup mandrel 106.

Figure 16:
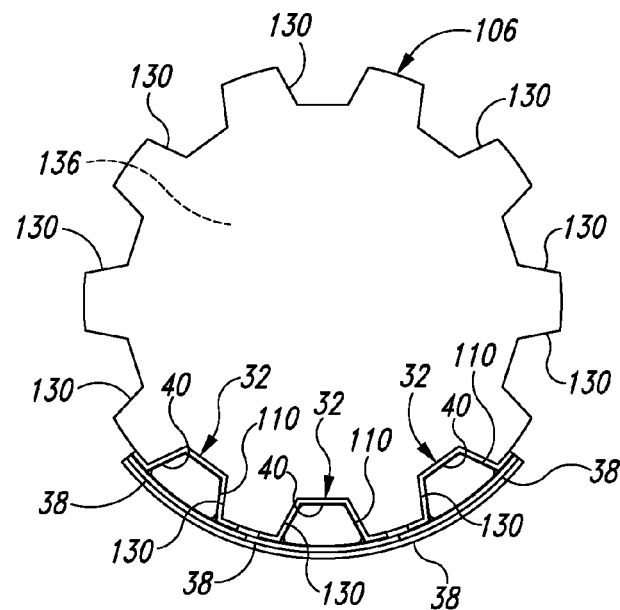
FIG. 16 is a schematic end view of an inner mold line layup mandrel with a plurality of stiffeners and skin segments loaded thereon, together with corresponding filler structures located within the stiffener cavities.

In some such methods 240 that include positioning 252, following the repeating 254, a larger skin segment 38 may be affixed over the plurality of skin segments 38 that were loaded via the loading 246, as indicated in FIG. 11 at 256. FIG. 16 illustrates the result of this optional affixing 256 following optional repeating 254, with a larger skin segment 38 extending over three loaded smaller skin segments 38 associated with corresponding stiffeners 32 and filler structures 110; however, any suitable configuration, size, and number of skin segments, both large and small, may be utilized in systems 140 and methods 240. As used herein, the affixing 256 of a skin segment includes optionally utilizing automated fiber placement to build-up a skin 30.

Alternatively, in methods 240 that do not include the optional positioning 252 of skin segments 38 and thus that do not include loading of skin segments 38 together with corresponding stiffeners 32 and filler structures 110 during the loading 246, optional methods 240 instead may include following the repeating 248, the affixing 256 of a skin segment 38 over a plurality of filler structures 110 and to the corresponding plurality of stiffeners 32, such as to their flanges 150, that were loaded on the inner mold line layup mandrel via the loading 246.

As indicated at 214 in FIG. 11, some methods 240 optionally further include prior to the loading 246, positioning a noodle or noodles 120 along the longitudinal edges of the filler structure 110. The placement of optional noodles 120 also is schematically illustrated in FIGS. 12-13. It also is within the scope of the present disclosure that the positioning 214 of noodles 120 may occur after the respective filler structure 110 and stiffener charge 144 have been loaded on the inner mold line layup mandrel 106. Additionally or alternatively, in some methods 240, the positioning 208 of a filler structure 110 may be described as including the positioning 214 of noodles 120.

Some methods 240 optionally further include prior to the positioning 244, applying an adhesive 116 to the upper side 148 of the filler structure 110 or to the lower side of the stiffener charge 144, as indicated in FIG. 11 at 216. Accordingly, the positioning 244 may be described as including adhering the stiffener charge 144 to the upper side 148 of the filler structure 110. Optional adhesive 116 is schematically illustrated in FIG. 12 between the stiffener charge 144 and the upper side 148 of the filler structure 110.

Additionally or alternatively, as schematically and optionally represented in FIGS. 10 and 11, in some systems 140 and methods 240, adhesive 116 also may be applied to an upper side of the stiffener charge 144 and/or to the respective stiffener form 130 so that the loading 246 includes adhering the stiffener charge 144, or stiffener 32, to the stiffener form 130. In FIG. 12, optional adhesive 116 is schematically illustrated as three adhesive strips spaced-apart laterally across the upper surface of the stiffener charge 144, with the outside two adhesive strips being positioned within regions of the stiffener charge 144 that will become optional flanges 150 of a respective stiffener 32.

In some methods 240, the loading 246 may include compacting, and optionally vacuum compacting, a stiffener 32 and corresponding filler structure 110 to the inner mold line layup mandrel 106 with the filler structure 110 within the stiffener cavity 40 of the stiffener 32. Accordingly, a loading tool 112 may include compaction structure 132 that is configured to operatively compact the stiffener 32 and filler structure 110 on the inner mold line layup mandrel 106. The compaction structure 132 simply may impart a compaction force to the filler structure 110, and optionally the flanges 150 of the stiffener 32. When an adhesive 116 is used, this compaction force may ensure the adhesion of the stiffener 32 to the inner mold line layup mandrel 106 and the filler structure 110 within the stiffener cavity 40 of the stiffener 32. Additionally or alternatively, the compaction structure 132 may be configured to vacuum compact the stiffener 32 to the inner mold line layup mandrel 106 and the filler structure 110 within the stiffener cavity 40. In FIG. 15, the optional compaction structure 132 is schematically illustrated as including a vacuum system 134 and a seal 135. With the seal 135 operatively engaged with the inner mold line layup mandrel 106, the vacuum system 134 operatively draws air from the interface between the filler location loading tool 112 and the inner mold line layup mandrel 106. Accordingly, when activated, the vacuum system 134 operatively may suction the filler structure 110 within the stiffener cavity 40 and the stiffener 32 within the stiffener form 130, resulting in the compaction of the filler structure 110 and the stiffener 32 to the inner mold line layup mandrel 106.

Some methods 240 optionally include prior to the repeating 248, rotating the inner mold line layup mandrel 106 to position the inner mold line layup mandrel 106 for subsequent loading 246 of a subsequent stiffener 32 and corresponding filler structure 110. FIGS. 14-15 schematically represent the loading of a subsequent stiffener 32 and corresponding filler structure 110 after an initial stiffener 32 and corresponding filler structure 110 has been loaded on the inner mold line layup mandrel 106.

As optionally and schematically indicated in FIG. 11 at 218, some methods 240 further may include following the optionally affixing 256, curing the stiffened composite structure 12.

As discussed, some apparatuses 10 may include several stiffened composite structures 12 that are assembled together to collectively define an apparatus 10 or a greater stiffened composite structure 12. Accordingly, as optionally and schematically indicated in FIG. 11, some methods 240 further may include following the optional affixing 256, again repeating the positioning 208, the positioning 244, and the loading 246, as indicated at 258, as many times as necessary to form another portion of a stiffened composite structure 12. Following the formation of multiple formed portions of a stiffened composite structure 12, the multiple formed portions may be assembled together, as indicated at 220. Depending on the size of the stiffened composite structure 12 and/or the portions thereof, each portion may be cured prior to final assembly, or multiple portions may first be assembled and then the entire assembly may be cured.

Figure 17:
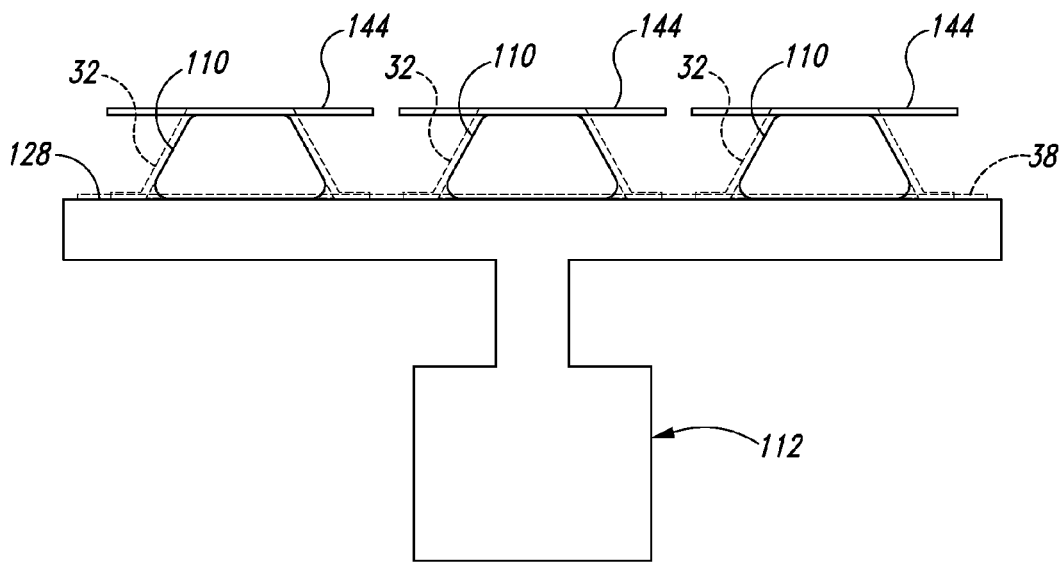
FIG. 17 is a schematic end view representing a loading tool, together with three filler structures positioned on an upper side of the loading tool and a stiffener charge positioned on an upper side of each of the three filler structures.

While systems 140 and methods 240 were generally discussed and schematically illustrated in FIGS. 12-15 in terms of positioning a single filler structure 110 and a single stiffener charge 144 on a loading tool 112 at a time, it is within the scope of systems 140 and methods 240 that more than one filler structure 110 and more than one stiffener charge 144 may be positioned on a loading tool 112 and operatively and simultaneously loaded on an inner mold line layup mandrel 106 by the loading tool 112. FIG. 17 schematically illustrates three filler structures 110 and three stiffener charges 144 positioned on the upper side 128 of a loading tool 112; however, a loading tool 112 may be configured to receive and operatively load any suitable number of filler structures 110 and stiffener charges 144, including two and/or more than three filler structures 110 and stiffener charges 144.

As optionally illustrated in FIG. 17, in some example methods 240 a skin segment 38 may be positioned on the upper side 128 of the loading tool 112 beneath more than one filler structure 110. Accordingly, in such example methods 240, the loading 246 may include loading the skin segment 38 onto the inner mold line layup mandrel 106 over multiple filler structures 110 and corresponding stiffeners 32. Additionally or alternatively, more than one skin segment 38 may be positioned on the upper side 128 of the loading tool 112, such as corresponding to the individual filler structures 110 and stiffener charges 144. Additionally or alternatively, skin segments 38 may be built up from various multiple skin segments 38 such as to define a larger skin segment 38 with desired properties, characteristics, thickness, etc., for example, depending on the configuration and shape of the inner mold line layup mandrel 106 and/or the stiffeners 32.

Figure 18:
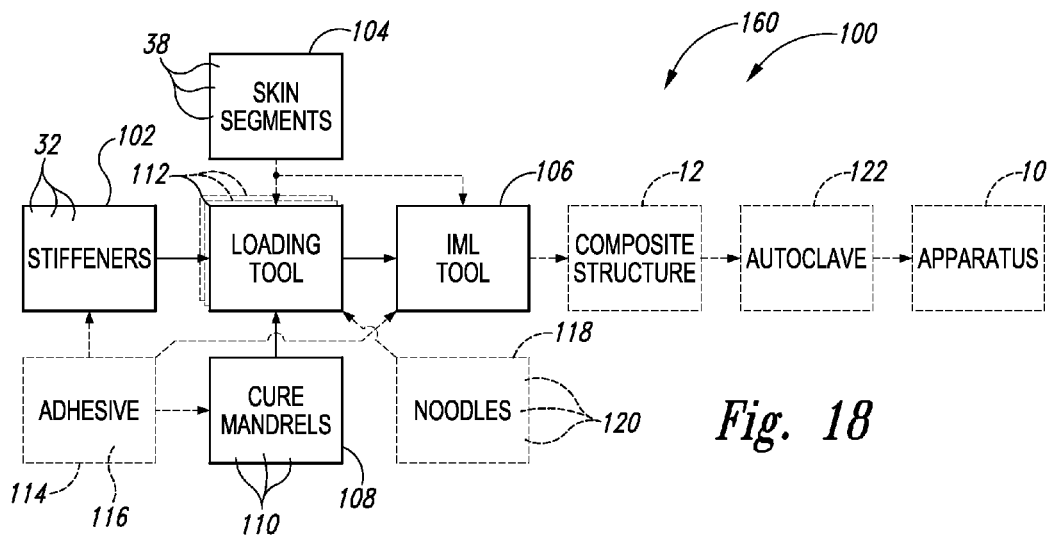
FIG. 18 is a schematic diagram representing systems for assembling stiffened composite structures.
Figure 19:
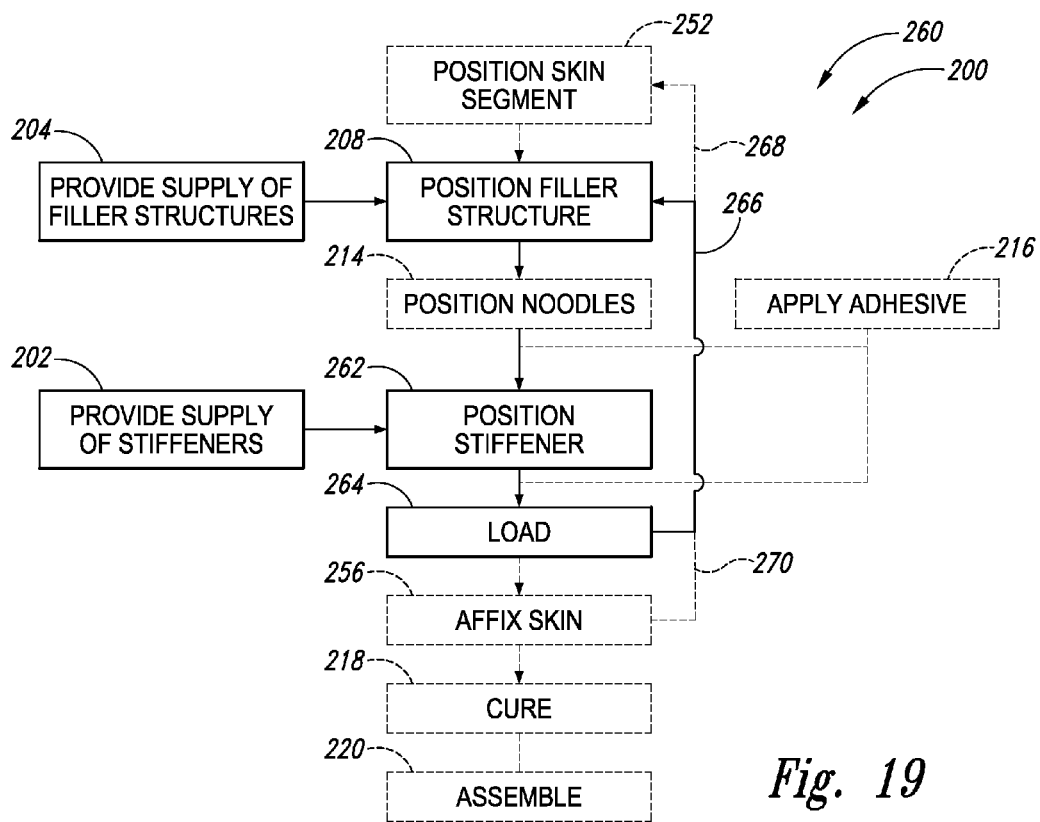
FIG. 19 is a flowchart schematically representing methods of assembling stiffened composite structures.
Figure 20:
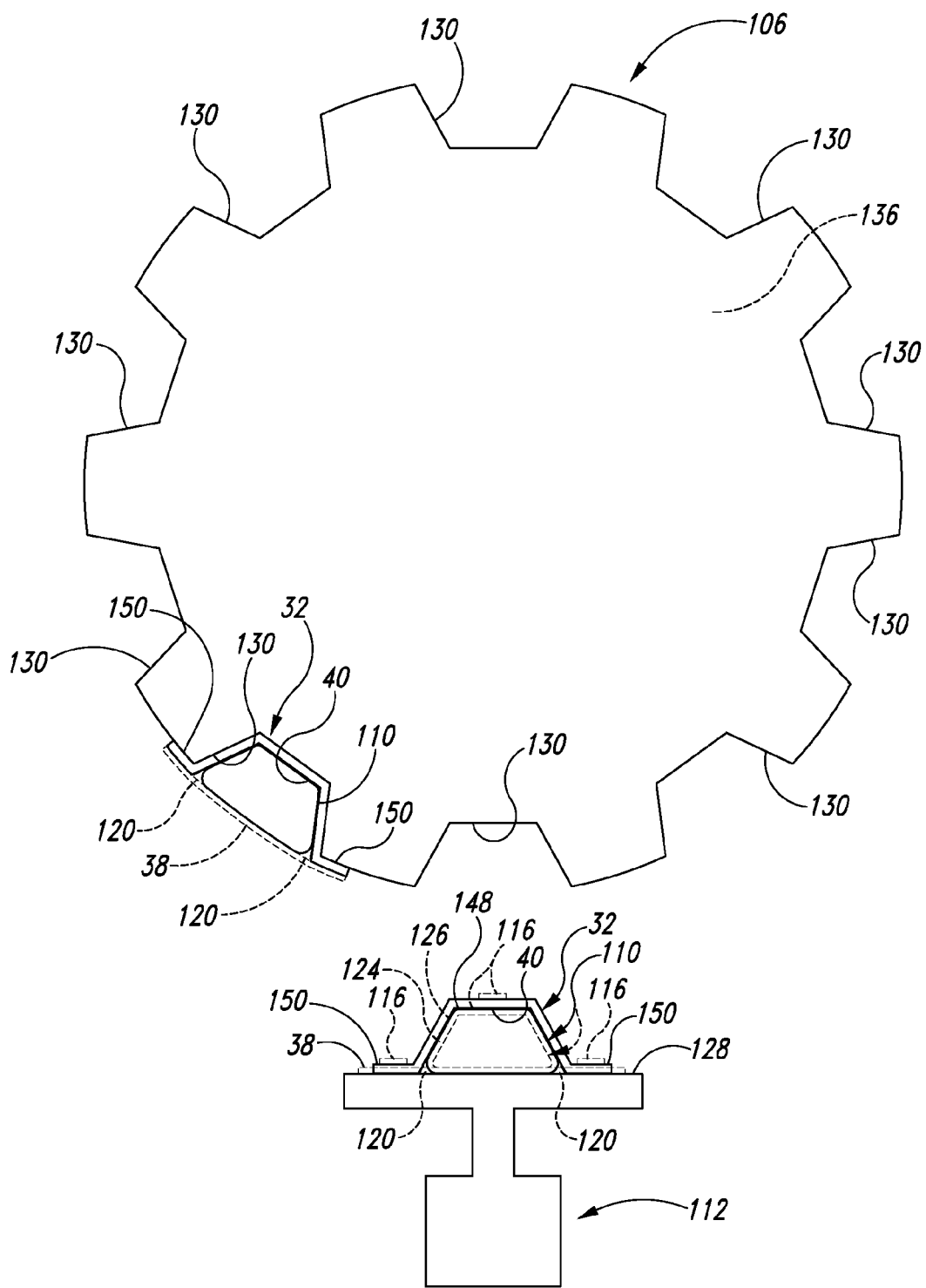
FIG. 20 is a schematic end view representing a loading tool, together with a filler structure positioned on the upper side of the loading tool and a stiffener positioned on the upper side of the filler structure, and with the loading tool positioned underneath an inner mold line layup mandrel for loading of the stiffener and the filler structure on the inner mold line layup mandrel.
Figure 21:
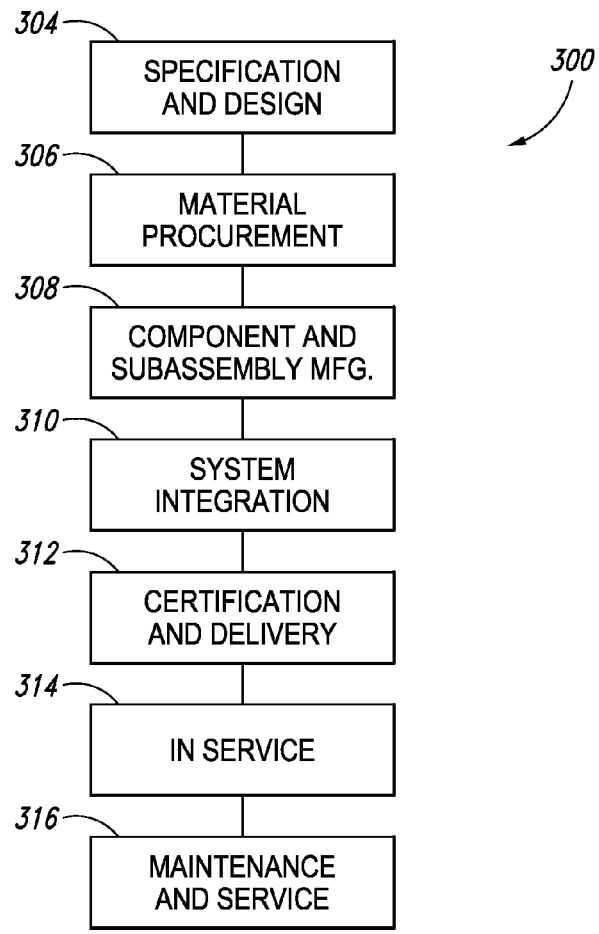
FIG. 21 is a flowchart schematically representing aircraft production and service methodology.

Turning now to FIGS. 18-20, FIG. 18 provides a schematic representation of additional illustrative, non-exclusive examples of systems 100 for assembly of composite structures 12, indicated and referred to herein as systems 160; FIG. 19 provides a flowchart schematically representing additional illustrative, non-exclusive examples of methods 200 for assembling composite structures 12, indicated and referred to herein as methods 260; and FIGS. 20-21 provide somewhat less schematic but still non-exclusive examples of component parts of systems 100, including systems 260, such as that perform and/or are utilized in connection with the performance of one or more steps of methods 200, including example methods 260. Systems 260 and methods 260 may be described as variations on systems 140 and methods 240.

More specifically, whereas systems 140 and methods 240 involve the forming, or molding, of stiffeners 32 directly on the inner mold line layup mandrel 106 during the loading 246 step of a method 240, systems 260 and methods 260 utilize stiffeners 32 that are fully formed, or at least nearly fully formed into their respective shapes, prior to being loaded on the inner mold line layup mandrel by a loading tool 112 in conjunction with a corresponding filler structure 110.

Similar to FIGS. 3 and 10, FIG. 18 additionally or alternatively may be described as schematically representing, or illustrating, the flow of material through a manufacturing facility, with the flow of materials ultimately resulting in a stiffened composite structure 12, and optionally resulting in a fully assembled apparatus 10. In FIGS. 18-20, some elements are illustrated in dashed lines, schematically representing that such elements may be optional or may correspond to an optional version of a system 160 and/or method 260. That said, not all systems 160 and methods 260 are required to include the elements illustrated in solid lines. The schematic representation of systems 160 and methods 260 in FIGS. 18-20 are not limiting and other systems 160, component parts of systems 160, methods 260, and steps of methods 260 are within the scope of the present disclosure, including systems 160 having greater than or fewer than the number of illustrated elements, as well as methods 260 having greater than or fewer than the number of illustrated steps, as understood from the discussions herein. As also understood from the discussions herein, methods 260 are not required to have the schematically represented steps of FIG. 19 performed in the order illustrated.

In FIGS. 18-20, like reference numerals are used to designate like elements of systems 100 and methods 200, and not all elements may be discussed fully again if already discussed with respect to systems 101, methods 201, systems 140, and/or methods 240, for example. However, like elements may include any of the various features, characteristics, aspects, functions, structures, etc. previously discussed with respect to such elements.

With reference first to FIG. 18, a system 160 may include a supply 102 of stiffeners 32, a supply 108 of filler structures 110, an inner mold line layup mandrel 106, and a loading tool 112. Additionally, in some embodiments, a system 160 further may include a supply 104 of skin segments 38, a supply 114 of adhesive 116, a supply 118 of radius fillers, or noodles, 120, and/or a curing oven or autoclave 122. FIG. 20 schematically represents illustrative, non-exclusive examples of component parts of a system 160; however, FIGS. 15-16 previously discussed with respect to systems 140 and methods 240, also represent optional systems 160 and methods 260.

Turning now to FIG. 19, but with continued reference to FIGS. 18 and 20, as well as to FIGS. 15-16, a method 260 of assembling a composite structure 12 may include providing a supply 102 of stiffeners 32, as indicated at 202; providing a supply 108 or filler structures 110, as indicated at 204; positioning a respective filler structure 110 from the supply 108 of filler structures 110 on an upper side 128 of a loading tool 112, as indicated at 208; positioning a respective stiffener 32 from the supply 102 of stiffeners 32 on an upper side 148 of the respective filler structure 110 so that the respective filler structure 110 is positioned within the stiffener cavity 40 of the respective stiffener 32, as indicated at 262; and then following the positioning 208 and the positioning 262, loading with the loading tool 112, the respective stiffener 32 and the respective filler structure 110 onto an inner mold line layup mandrel, as indicated at 264. Then, as schematically indicated in FIG. 19 at 266, the positioning 208, the positioning 262, and the loading 264 are repeated to load a plurality of stiffeners 32 and a plurality of filler structures 110 onto the inner mold line layup mandrel 106.

FIG. 20 schematically illustrates a filler structure 110 operatively positioned on the upper surface 128 of the loading tool 112 and a stiffener 32 operatively positioned on the upper surface 148 of the filler structure 110. A first stiffener 32 and corresponding filler structure 110 is already loaded on the inner mold line layup mandrel 106, and the loading tool 112 is operatively positioned underneath an inner mold line layup mandrel 106 for subsequent loading of a second stiffener 32 and corresponding filler structure 110. Referring back to FIG. 15, the loading tool 112 has raised the stiffener 32 and corresponding filler structure 110 into a stiffener form 130 of the inner mold line layup mandrel 106. Accordingly, the loading 264 may include positioning the respective stiffener 32 and the respective filler structure 110 within a stiffener form 130 defined by the inner mold line layup mandrel 106. In FIG. 20, the stiffeners 32 are illustrated as flanged hat-shaped stringers; however, as discussed herein, hat-shaped stringers and flanged stringers are not required to be used in all systems 100 and methods 200, and any suitable configuration of stringers, including flangeless stringers may be used.

While FIG. 20 schematically illustrates the loading of a filler structure 110 and stiffener 32 from underneath the inner mold line layup mandrel 106, such a configuration is not required in all systems 100 and methods 200, and it is within the scope of the present disclosure, including with respect to systems 160 and methods 260, that a loading tool 112 may be configured to operatively load a filler structure 110 and stiffener 32 from any suitable orientation relative to the inner mold line layup mandrel 106. For example, a loading tool 112 may be configured to load a filler structure 110 onto any suitable location on the inner mold line layup mandrel 106, including locations that are at an angle relative to the horizontal, and including locations on the bottom half of the inner mold line layup mandrel 106, as well as locations on the upper half of the inner mold line layup mandrel 106.

As schematically represented in FIG. 18, a system 160 additionally may include a supply 104 of skin segments 38 for loading onto the inner mold line layup mandrel 106. In some methods 260, prior to the positioning 208 of a filler structure 110 on the upper surface 128 of the loading tool 112, a skin segment 38 first may be positioned on the upper side 128 of the loading tool, as schematically indicated in FIG. 19 at 252 and also schematically illustrated in FIG. 20. In such example methods 260, the positioning 208 includes positioning the filler structure 110 on an upper side of the skin segment 38, and the loading 264 includes loading the skin segment 38 onto the inner mold line layup mandrel 106 over the filler structure 110 and the corresponding stiffener 32, as schematically illustrated in FIG. 15 with the optional skin segment 38 loaded on the inner mold line layup mandrel 106 with the stiffener 32 and corresponding filler structure 110. Moreover, in such example methods 260, the repeating 266 also may include repeating the positioning 252, as schematically and optionally indicated in FIG. 11 at 268, so that a plurality of stiffeners 32, a plurality of filler structures 110, and a plurality of skin segments 38 are operatively loaded on the inner mold line layup mandrel 106.

In some such methods 260 that include positioning 252, following the repeating 268, a larger skin segment 38 may be affixed over the plurality of skin segments 38 that were loaded via the loading 264, as indicated in FIG. 19 at 256. FIG. 16 illustrates the result of this optional affixing 256 following optional repeating 268, with a larger skin segment 38 extending over three loaded smaller skin segments 38 associated with corresponding stiffeners 32 and filler structures 110; however, any suitable configuration, size, and number of skin segments, both large and small, may be utilized in systems 160 and methods 260.

Alternatively, in methods 260 that do not include the optional positioning 252 of skin segments 38 and thus that do not include loading of skin segments 38 together with corresponding stiffeners 32 and filler structures 110 during the loading 264, optional methods 260 instead may include following the repeating 266, the affixing 256 of a skin segment 38 over a plurality of filler structures 110 and to the corresponding plurality of stiffeners 32, such as to their flanges 150, that were loaded on the inner mold line layup mandrel via the loading 264.

As indicated at 214 in FIG. 19, some methods 260 optionally further include prior to the loading 264, positioning a noodle or noodles 120 along the longitudinal edges of the filler structure 110. The placement of optional noodles 120 also is schematically illustrated in FIG. 20. It also is within the scope of the present disclosure that the positioning 214 of noodles 120 may occur after the respective filler structure 110 and stiffener 32 have been loaded on the inner mold line layup mandrel 106. Additionally or alternatively, in some methods 260, the positioning 208 of a filler structure 110 may be described as including the positioning 214 of noodles 120.

Some methods 260 optionally further include prior to the positioning 262, applying an adhesive 116 to the upper side 148 of the filler structure 110 or to the lower side of the stiffener 32, as indicated in FIG. 19 at 216. Accordingly, the positioning 262 may be described as including adhering the stiffener 32 to the upper side 148 of the filler structure 110. Optional adhesive 116 is schematically illustrated in FIG. 20 between the stiffener 32 and the upper side 148 of the filler structure 110.

Additionally or alternatively, as schematically and optionally represented in FIG. 20, in some systems 160 and methods 260, adhesive 116 also may be applied to an upper side of the stiffener 32 and/or to the respective stiffener form 130 so that the loading 264 includes adhering the stiffener 32 to the stiffener form 130. In FIG. 20, optional adhesive 116 is schematically illustrated as three adhesive strips spaced-apart laterally across the upper surface of the stiffener 32, with the outside two adhesive strips being positioned on the optional flanges 150 of the stiffener 32 and with the middle adhesive strip being positioned within a region of the stiffener 32 that will be positioned in and engage the stiffener form 130 of the inner mold line layup mandrel 106 during the loading 264.

In some methods 260, the loading 264 may include compacting, and optionally vacuum compacting, a stiffener 32 and corresponding filler structure 110 to the inner mold line layup mandrel 106 with the filler structure 110 within the stiffener cavity 40 of the stiffener 32. Accordingly, a loading tool 112 may include compaction structure 132 that is configured to operatively compact the stiffener 32 and filler structure 110 on the inner mold line layup mandrel 106. The compaction structure 132 simply may impart a compaction force to the filler structure 110, and optionally the flanges 150 of the stiffener 32. When an adhesive 116 is used, this compaction force may ensure the adhesion of the stiffener 32 to the inner mold line layup mandrel 106 and the filler structure 110 within the stiffener cavity 40 of the stiffener 32. Additionally or alternatively, the compaction structure 132 may be configured to vacuum compact the stiffener 32 to the inner mold line layup mandrel 106 and the filler structure 110 within the stiffener cavity 40. In FIG. 20, the optional compaction structure 132 is schematically illustrated as including a vacuum system 134 and a seal 135. With the seal 135 operatively engaged with the inner mold line layup mandrel 106, the vacuum system 134 operatively draws air from the interface between the filler location loading tool 112 and the inner mold line layup mandrel 106. Accordingly, when activated, the vacuum system 134 operatively may suction the filler structure 110 within the stiffener cavity 40 and the stiffener 32 within the stiffener form 130, resulting in the compaction of the filler structure 110 and the stiffener 32 to the inner mold line layup mandrel 106.

Some methods 260 optionally may include prior to the repeating 266, rotating the inner mold line layup mandrel 106 to position the inner mold line layup mandrel 106 for subsequent loading 264 of a subsequent stiffener 32 and corresponding filler structure 110. FIG. 20 schematically represents the loading of a subsequent stiffener 32 and corresponding filler structure 110 after an initial stiffener 32 and corresponding filler structure 110 has been loaded on the inner mold line layup mandrel 106.

As optionally and schematically indicated in FIG. 19 at 218, some methods 260 further may include following the optionally affixing 256, curing the stiffened composite structure 12.

As discussed, some apparatuses 10 may include several stiffened composite structures 12 that are assembled together to collectively define an apparatus 10 or a greater stiffened composite structure 12. Accordingly, as optionally and schematically indicated in FIG. 19, some methods 260 further may include following the optional affixing 256, again repeating the positioning 208, the positioning 262, and the loading 264, as indicated at 270, as many times as necessary to form another portion of a stiffened composite structure 12. Following the formation of multiple formed portions of a stiffened composite structure 12, the multiple formed portions may be assembled together, as indicated at 220. Depending on the size of the stiffened composite structure 12 and/or the portions thereof, each portion may be cured prior to final assembly, or multiple portions may first be assembled and then the entire assembly may be cured.

While systems 160 and methods 260 were generally discussed and schematically illustrated in FIG. 20 in terms of positioning a single filler structure 110 and a single stiffener 32 on a loading tool 112 at a time, it is within the scope of systems 160 and methods 260 that more than one filler structure 110 and more than one stiffener 32 may be positioned on a loading tool 112 and operatively and simultaneously loaded on an inner mold line layup mandrel 106 by the loading tool 112. FIG. 17 schematically illustrates three filler structures 110 and optionally in dashed lines three stiffeners 32 positioned on the upper side 128 of a loading tool 112; however, a loading tool 112 may be configured to receive and operatively load any suitable number of filler structures 110 and stiffeners 32, including two and/or more than three filler structures 110 and stiffeners 32.

Moreover, as optionally illustrated in FIG. 17, in some example methods 260 a skin segment 38 may be positioned on the upper side 128 of the loading tool 112 beneath more than one filler structure 110. Accordingly, in such example methods 260, the loading 264 may include loading the skin segment 38 onto the inner mold line layup mandrel 106 over multiple filler structures 110 and corresponding stiffeners 32. Additionally or alternatively, more than one skin segment 38 may be positioned on the upper side 128 of the loading tool 112, such as corresponding to the individual filler structures 110 and stiffeners 32. Additionally or alternatively, skin segments 38 may be built up from various multiple skin segments 38 such as to define a larger skin segment 38 with desired properties, characteristics, thickness, etc., for example, depending on the configuration and shape of the inner mold line layup mandrel 106 and/or the stiffeners 32.

Figure 22:
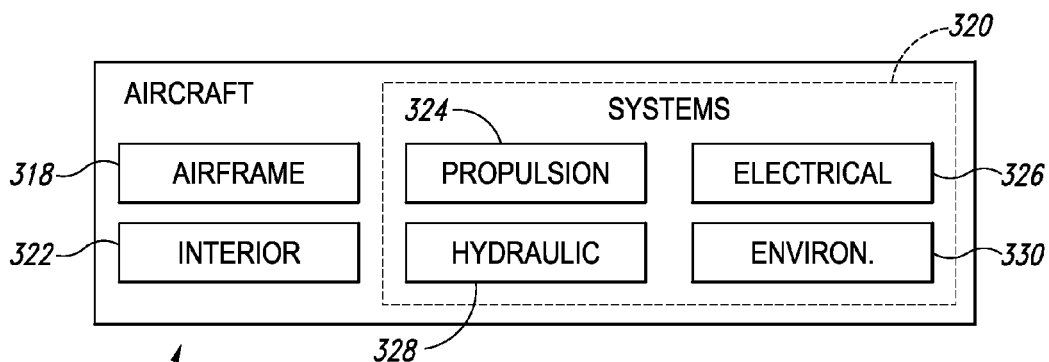
FIG. 22 is a block diagram schematically representing an aircraft.

Turning now to FIGS. 21-22, embodiments of the present disclosure may be described in the context of an aircraft manufacturing and service method 300 as shown in FIG. 21 and an aircraft 14 as shown in FIG. 22. During pre-production, exemplary method 300 may include specification and design 304 of the aircraft 14 and material procurement 306. During production, component and subassembly manufacturing 308 and system integration 310 of the aircraft 14 takes place. Thereafter, the aircraft 14 may go through certification and delivery 312 in order to be placed in service 314. While in service by a customer, the aircraft 14 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 22, the aircraft 14 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 300. For example, components or subassemblies corresponding to production process 308 may be fabricated or manufactured in a manner similar to components or subassemblies produced while the aircraft 14 is in service. Also, one or more apparatus embodiments, method embodiments, or a combination thereof may be utilized during the production stages 308 and 310, for example, by substantially expediting assembly of or reducing the cost of an aircraft 14. Similarly, one or more of apparatus embodiments, method embodiments, or a combination thereof may be utilized while the aircraft 14 is in service, for example and without limitation, to maintenance and service 316.

Illustrative, non-exclusive examples of inventive subject matter according to the present disclosure are described in the following enumerated paragraphs:

A. A method of assembling a stiffened composite structure, comprising:

providing a supply of stiffeners, wherein each stiffener defines a stiffener cavity;

providing a supply of filler structures;

loading a respective stiffener from the supply of stiffeners onto an inner mold line layup mandrel;

positioning a respective filler structure from the supply of filler structures on an upper side of a filler location tool;

following the loading and the positioning, locating, with the filler location tool, the respective filler structure within the stiffener cavity of the respective stiffener;

repeating the loading, the positioning, and the locating to load a plurality of stiffeners onto the inner mold line layup mandrel and to locate a plurality of filler structures within the stiffener cavities of the plurality of stiffeners; and following the repeating, affixing a skin segment over the plurality of filler structures and to the plurality of stiffeners loaded on the inner mold line layup mandrel to form at least a portion of the stiffened composite structure.

A1. The method of paragraph A, wherein the positioning further includes positioning a noodle along the longitudinal edges of the respective filler structure.

A2. The method of any of paragraphs A-A1, further comprising:

prior to the locating, applying an adhesive to an upper side of the respective filler structure; wherein the locating includes adhering the respective filler structure within the stiffener cavity of the respective stiffener.

A2.1. The method of paragraph A2, wherein the adhesive includes an adhesive strip.

A3. The method of any of paragraphs A-A2.1, wherein the locating includes:

positioning the filler location tool vertically underneath the inner mold line layup mandrel; and raising the respective filler structure with the filler location tool.

A4. The method of any of paragraphs A-A3, wherein the locating includes vacuum compacting, with the filler location tool, the respective filler structure within the stiffener cavity of the respective stiffener.

A4.1 The method of paragraph A4 when depending from paragraph A3, wherein the raising stops prior to the respective filler structure operatively engaging the respective stiffener; and wherein the vacuum compacting is performed following the raising to operatively suction the respective filler structure within the stiffener cavity of the respective stiffener.

A4.2 The method of any of paragraphs A4-A4.1, wherein the vacuum compacting includes any suitable method disclosed in U.S. patent application Ser. No. 13/769,022.

A5. The method of any of paragraphs A-A4.2, further comprising:

prior to the repeating, rotating the inner mold line layup mandrel to position the inner mold line layup mandrel for subsequent loading of a subsequent stiffener and locating of a subsequent filler structure.

A6. The method of any of paragraphs A-A5, wherein the inner mold line layup mandrel includes a plurality of spaced-apart stiffener forms, each stiffener form having an outer surface that corresponds to one side of the stiffeners; and wherein the loading includes loading the respective stiffener onto a respective stiffener form.

A7. The method of any of paragraphs A-A6, wherein the loading includes any suitable method disclosed in U.S. patent application Ser. No. 13/732,961.

A8. The method of any of paragraphs A-A7, wherein the affixing includes any suitable method disclosed in U.S. patent application Ser. No. 13/693,887, U.S. patent application Ser. No. 13/886,976, and/or U.S. patent application Ser. No. 13/887,006.

A9. The method of any of paragraphs A-A8, wherein the loading and the positioning are performed as parallel processes, or simultaneously or concurrently, during the assembling of the stiffened composite structure.

A10. The method of any of paragraphs A-A9, further comprising:

following the affixing, curing the at least a portion of the stiffened composite structure.

A11. The method of any of paragraphs A-A10, further comprising:

following the affixing, repeating the repeating the loading, the positioning, and the locating and repeating the affixing to form a greater portion of the stiffened composite structure.

A11.1. The method of paragraph A11, further comprising:

following the repeating the repeating the loading, the positioning, and the locating and repeating the affixing, assembling a plurality of formed portions of the stiffened composite structure to form the stiffened composite structure.

A12. The method of any of paragraphs A-A11.1, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

A13. The method of any of paragraphs A-A12, wherein the filler structures each include a filler structure body, a breather sock extending over the filler structure body, and filler release material extending over the breather sock.

A14. The method of any of paragraphs A-A13, wherein the filler structure is constructed of rubber, optionally when depending from paragraph A12, wherein the filler structure body is constructed of rubber.

A15. The method of any of paragraphs A-A14, wherein the stiffeners include stringers.

A16. The method of any of paragraphs A-A15, wherein the stiffeners are constructed of fiber reinforced composite material, and optionally of pre-preg composite plies.

A17. The method of any of paragraphs A-A16, wherein the skin segments are constructed of fiber reinforced composite material, and optionally of pre-preg composite plies.

A18. The method of any of paragraphs A-A17, wherein the method utilizes the system of any of paragraphs C-C13.

B. A stiffened composite structure constructed using the method of any of paragraphs A-A18, optionally wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

C. A system for assembling stiffened composite structures, comprising:

a supply of stiffeners, wherein each stiffener defines a stiffener cavity;

a supply of filler structures, wherein each filler structure is configured to be positioned within a stiffener cavity;

an inner mold line layup mandrel; and a filler location tool configured to locate a respective filler structure from the supply of filler structures within a respective stiffener cavity of a respective stiffener that is loaded onto the inner mold line layup mandrel.

C1. The system of paragraph C, further comprising:

a supply of skin segments for loading onto the inner mold line layup mandrel, onto a plurality of stiffeners loaded on the inner mold line layup mandrel, and over a plurality of filler structures inserted within respective stiffener cavities of the plurality of stiffeners.

C1.1. The system of paragraph C1, further comprising:

a skin segment loading tool configured to load a respective skin segment from the supply of skin segments onto the inner mold line layup mandrel, onto a plurality of stiffeners loaded on the inner mold line layup mandrel, and over a plurality of filler structures located within respective stiffener cavities of the plurality of stiffeners, optionally wherein the skin segment loading tool includes any suitable structure disclosed in U.S. patent application Ser. No. 13/693,887, U.S. patent application Ser. No. 13/886,976, and/or U.S. patent application Ser. No. 13/887,006.

C2. The system of any of paragraphs C-C1.1, further comprising:

a stiffener loading tool configured to load a respective stiffener from the supply of stiffeners onto the inner mold line layup mandrel, optionally wherein the stiffener loading tool includes any suitable structure disclosed in U.S. patent application Ser. No. 13/732,961.

C3. The system of any of paragraphs C-C2, further comprising:

a supply of adhesive configured to be applied to one side of the respective filler structure prior to the respective filler structure being located within the respective stiffener cavity, optionally wherein the supply of adhesive includes a plurality of adhesive strips.

C4. The system of any of paragraphs C-C3, wherein the filler location tool includes compaction structure that is configured to compact, optionally vacuum compact, the respective filler structure within the stiffener cavity of the respective stiffener, optionally wherein the compaction structure is configured to suction the respective filler structure within the stiffener cavity of the respective stiffener, and optionally wherein the compaction structure includes any suitable structure disclosed in U.S. patent application Ser. No. 13/769,022.

C5. The system of any of paragraphs C-C4, wherein the inner mold line layup mandrel includes a plurality of spaced-apart stiffener forms, each stiffener form having an outer surface that corresponds to one side of the stiffeners.

C6. The system of any of paragraphs C-C5, wherein the inner mold line layup mandrel includes rotation structure that is configured to rotate the inner mold line layup mandrel after each loading of the respective stiffener and locating of the respective filler structure within the respective stiffener cavity.

C7. The system of any of paragraphs C-C6, wherein the stiffeners are constructed of fiber reinforced composite material, and optionally of pre-preg composite plies.

C8. The system of any of paragraphs C1-C7 when depending from paragraph C1, wherein the skin segments are constructed of fiber reinforced composite material, and optionally of pre-preg composite plies.

C9. The system of any of paragraphs C-C8, wherein each filler structure includes a filler structure body, a breather sock extending over the filler structure body, and filler release material extending over the breather sock.

C10. The system of any of paragraphs C-C9, wherein the filler structure is constructed of rubber or rubber-like material, optionally when depending from paragraph C9, wherein the filler structure body is constructed of rubber or rubber-like material.

C11. The system of any of paragraphs C-C10, further comprising:

a curing oven or autoclave configured to receive the stiffened composite structure and to cure the stiffened composite structure.

C12. The system of any of paragraphs C-C11, wherein the system is used to perform the method of any of paragraphs A-A18.

C13. The system of any of paragraphs C-C12, wherein the system is configured to construct one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

D. A method of assembling a stiffened composite structure, comprising:

providing a supply of filler structures;

providing a supply of stiffener charges;

positioning a respective filler structure from the supply of filler structures on an upper side of a loading tool;

positioning a respective stiffener charge from the supply of stiffener charges on an upper side of the respective filler structure;

following the positioning the respective filler structure and the positioning the respective stiffener charge, loading, with the loading tool, the respective stiffener charge and the respective filler structure onto an inner mold line layup mandrel, wherein the inner mold line layup mandrel includes a plurality of stiffener forms, and wherein the loading includes conforming the respective stiffener charge to a respective stiffener form of the plurality of stiffener forms to form a respective stiffener with a respective stiffener cavity and with the respective filler structure being positioned within the respective stiffener cavity; and repeating the positioning the respective filler structure, the positioning the respective stiffener charge, and the loading to load a plurality of stiffeners and a plurality of filler structures onto the inner mold line layup mandrel.

D1. The method of paragraph D, further comprising:

following the positioning the respective stiffener charge and prior to the loading, deforming the respective stiffener charge at least partially over the upper surface of the respective filler structure.

D2. The method of any of paragraphs D-D1, further comprising:

providing a plurality of skin segments; and prior to the positioning the respective filler structure, positioning a respective skin segment from the plurality of skin segments on the upper side of the loading tool;

wherein the positioning the respective filler structure includes positioning the respective filler structure on an upper side of the respective skin segment;

wherein the loading includes loading the respective skin segment onto the inner mold line layup mandrel over the respective filler structure and the respective stiffener; and wherein the repeating includes repeating the positioning the respective filler structure, the positioning the respective stiffener charge, the positioning the respective skin segment, and the loading to load a plurality of stiffeners, a plurality of filler structures, and a plurality of skin segments onto the inner mold line layup mandrel;

optionally wherein the positioning the respective filler structure includes positioning more than one filler structure on the upper side of the respective skin segment and the positioning the respective stiffener charge includes positioning a respective stiffener charge on the upper side of each of the more than one filler structure.

D2.1 The method of paragraphs D2, further comprising:

following the repeating, affixing a larger skin segment over the plurality of skin segments loaded on the inner mold line layup mandrel.

D3. The method of any of paragraphs D-D1, further comprising:

following the repeating, affixing a skin segment over the plurality of filler structures and to the plurality of stiffeners loaded on the inner mold line layup mandrel.

D4. The method of any of paragraphs D2.1-D3, wherein the affixing includes any suitable method disclosed in U.S. patent application Ser. No. 13/693,887, U.S. patent application Ser. No. 13/886,976, and/or U.S. patent application Ser. No. 13/887,006.

D5. The method of any of paragraphs D-D4, wherein the positioning the respective filler structure further includes positioning a noodle along the longitudinal edges of the respective filler structure.

D6. The method of any of paragraphs D-D5, further comprising:

prior to the positioning the respective stiffener charge, applying an adhesive to the upper side of the respective filler structure and/or applying an adhesive to a lower side of the respective stiffener charge;

wherein the positioning the respective stiffener charge includes adhering the respective stiffener charge to the upper side of the respective filler structure.

D7. The method of any of paragraphs D-D6, further comprising:

prior to the loading, applying an adhesive to an upper side of the respective stiffener charge and/or applying an adhesive to the respective stiffener form;

wherein the loading includes adhering the respective stiffener to the respective stiffener form.

D8. The method of any of paragraphs D6-D7, wherein the adhesive includes an adhesive strip.

D9. The method of any of paragraphs D-D8, wherein the loading includes:

positioning the loading tool vertically underneath the inner mold line layup mandrel; and raising the respective stiffener charge and the respective filler structure with the loading tool.

D10. The method of any of paragraphs D-D9, wherein the loading includes vacuum compacting, with the loading tool, the respective stiffener to the inner mold line layup mandrel and the respective filler structure within the respective stiffener cavity of the respective stiffener.

D10.1 The method of paragraph D10, wherein the vacuum compacting includes any suitable method disclosed in U.S. patent application Ser. No. 13/769,022.

D11. The method of any of paragraphs D-D10.1, further comprising:

prior to the repeating, rotating the inner mold line layup mandrel to position the inner mold line layup mandrel for subsequent loading of a subsequent stiffener and a subsequent filler structure.

D12. The method of any of paragraphs D2-D11 when depending from either of paragraph D2 or paragraph D3, further comprising:

following the repeating, curing the at least a portion of the stiffened composite structure.

D13. The method of any of paragraphs D2.1-D12 when depending from either of paragraph D2.1 or D3, further comprising:

following the affixing, repeating the repeating the positioning the respective filler structure, the positioning the respective stiffener charge, and the loading and repeating the affixing to form a greater portion of the stiffened composite structure.

D13.1. The method of paragraph D13, further comprising:

following the repeating the repeating the positioning the respective filler structure, the positioning the respective stiffener charge, and the loading and the repeating the affixing, assembling a plurality of formed portions of the stiffened composite structure to form the stiffened composite structure.

D14. The method of any of paragraphs D-D13.1, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

D15. The method of any of paragraphs D-D14, wherein the filler structures each include a filler structure body, a breather sock extending over the filler structure body, and filler release material extending over the breather sock.

D16. The method of any of any of paragraphs D-D15, wherein the filler structures are constructed of rubber, optionally when depending from paragraph D15, wherein the filler structure body is constructed of rubber.

D17. The method of any of paragraphs D-D16, wherein the stiffeners include stringers.

D18. The method of any of paragraphs D-D17, wherein the stiffener charges are constructed of fiber reinforced composite material, and optionally of pre-preg composite plies.

D19. The method of any of paragraphs D2-D18 when depending from paragraph D2, wherein the skin segments are constructed of fiber reinforced composite material, and optionally of pre-preg composite plies.

D20. The method of any of paragraphs D-D19, wherein the method utilizes the system of any of paragraphs F-F14.

E. A stiffened composite structure constructed using the method of any of paragraphs D-D20, optionally wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

F. A system for assembling stiffened composite structures, comprising:

a supply of stiffener charges;

a supply of filler structures;

an inner mold line layup mandrel, wherein the inner mold line layup mandrel includes a plurality of stiffener forms; and a loading tool configured to receive a respective filler structure from the supply of filler structures on an upper side of the loading tool and a respective stiffener charge on an upper side of the respective filler structure, and to operatively load the respective stiffener charge and the respective filler structure onto the inner mold line layup mandrel so that the respective stiffener charge conforms to a respective stiffener form of the plurality of stiffener forms to define a respective stiffener with a respective stiffener cavity and so that the respective filler structure is positioned within the respective stiffener cavity.

F1. The system of paragraph F, further comprising:

a preforming tool configured to deform the respective stiffener charge at least partially over the upper surface of the respective filler structure prior to the loading tool operatively loading the respective stiffener charge and the respective filler structure onto the inner mold line layup mandrel.

F2. The system of any of paragraphs F-F1, further comprising:

a supply of skin segments for loading onto the inner mold line layup mandrel.

F2.1. The system of paragraph F2, wherein the loading tool is further configured to receive a respective skin segment from the plurality of skin segments on the upper side of the loading tool beneath the respective filler structure, and wherein the loading tool is further configured to load the respective skin segment onto the inner mold line layup mandrel over the respective filler structure and the respective stiffener;

optionally wherein the loading tool is further configured to receive a respective skin segment on the upper side of the loading tool beneath more than one filler structure and more than one stiffener charge, and wherein the loading tool is further configured to load the respective skin segment onto the inner mold line layup mandrel over the more than one filler structure and the more than one stiffener charge.

F2.2. The system of any of paragraphs F2-F2.1, further comprising:

a skin segment loading tool configured to load a respective skin segment from the supply of skin segments onto the inner mold line layup mandrel, onto a plurality of stiffeners loaded on the inner mold line layup mandrel, and over a plurality of filler structures located within respective stiffener cavities of the plurality of stiffeners, optionally wherein the skin segment loading tool includes any suitable structure disclosed in U.S. patent application Ser. No. 13/693,887, U.S. patent application Ser. No. 13/886,976, and/or U.S. patent application Ser. No. 13/887,006.

F3. The system of any of paragraphs F-F2.2, further comprising:

a supply of noodles configured to be positioned along the longitudinal edges of respective filler structures positioned on the upper surface of the loading tool and to be loaded on the inner mold line layup mandrel together with respective stiffener charges and respective filler structures.

F4. The system of any of paragraphs F-F3, further comprising:

a supply of adhesive configured to be applied between the respective filler structure and the respective stiffener charge and between the respective stiffener charge and the inner mold line layup mandrel, optionally wherein the supply of adhesive includes a plurality of adhesive strips.

F5. The system of any of paragraphs F-F4, wherein the loading tool includes compaction structure that is configured to compact, optionally vacuum compact, the respective stiffener to the inner mold line layup mandrel and the respective filler structure within the respective stiffener cavity of the respective stiffener, and optionally wherein the compaction structure includes any suitable structure disclosed in U.S. patent application Ser. No. 13/769,022.

F6. The system of any of paragraphs F-F5, wherein the loading tool is configured to operatively load the respective stiffener charge and the respective filler structure from vertically underneath the inner mold line layup mandrel.

F7. The system of any of paragraphs F-F6, wherein the inner mold line layup mandrel includes rotation structure that is configured to rotate the inner mold line layup mandrel after each loading of the respective stiffener charge and the respective filler structure.

F8. The system of any of paragraphs F-F7, wherein the stiffener charges are constructed of fiber reinforced composite material, and optionally of pre-preg composite plies.

F9. The system of any of paragraphs F2-F8 when depending from paragraph F2, wherein the skin segments are constructed of fiber reinforced composite material, and optionally of pre-preg composite plies.

F10. The system of any of paragraphs F-F9, wherein each filler structure includes a filler structure body, a breather sock extending over the filler structure body, and filler release material extending over the breather sock.

F11. The system of any of paragraphs F-F10, wherein the filler structure is constructed of rubber or rubber-like material, optionally when depending from paragraph F10, wherein the filler structure body is constructed of rubber or rubber-like material.

F12. The system of any of paragraphs F-F11, further comprising:

a curing oven or autoclave configured to receive a stiffened composite structure assembled by the system and to cure the stiffened composite structure.

F13. The system of any of paragraphs F-F12, wherein the system is used to perform the method of any of paragraphs D-D20.

F14. The system of any of paragraphs F-F13, wherein the system is configured to construct one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

G. A method of assembling a stiffened composite structure, comprising:

providing a supply of stiffeners, wherein each stiffener defines a stiffener cavity;

providing a supply of filler structures;

positioning a respective filler structure from the supply of filler structures on an upper side of a loading tool;

positioning a respective stiffener from the supply of stiffeners on an upper side of the respective filler structure so that the respective filler structure is positioned within a respective stiffener cavity of the respective stiffener;

following the positioning the respective filler structure and the positioning the respective stiffener, loading, with the loading tool, the respective stiffener and the respective filler structure onto an inner mold line layup mandrel, wherein the inner mold line layup mandrel includes a plurality of stiffener forms, and wherein the loading includes positioning the respective stiffener and the respective filler structure within a respective stiffener form of the plurality of stiffener forms; and repeating the positioning the respective filler structure, the positioning the respective stiffener, and the loading to load a plurality of stiffeners and a plurality of filler structures onto the inner mold line layup mandrel.

G1. The method of paragraph G, further comprising:

providing a plurality of skin segments; and prior to the positioning the respective filler structure, positioning a respective skin segment from the plurality of skin segments on the upper side of the loading tool;

wherein the positioning the respective filler structure includes positioning the respective filler structure on an upper side of the respective skin segment;

wherein the loading includes loading the respective skin segment onto the inner mold line layup mandrel over the respective filler structure and the respective stiffener; and wherein the repeating includes repeating the positioning the respective filler structure, the positioning the respective stiffener, the positioning the respective skin segment, and the loading to load a plurality of stiffeners, a plurality of filler structures, and a plurality of skin segments onto the inner mold line layup mandrel;

optionally wherein the positioning the respective filler structure includes positioning more than one filler structure on the upper side of the respective skin segment and the positioning the respective stiffener includes positioning a respective stiffener on the upper side of each of the more than one filler structure.

G1.1 The method of paragraphs G1, further comprising:

following the repeating, affixing a larger skin segment over the plurality of skin segments loaded on the inner mold line layup mandrel.

G2. The method of paragraph G, further comprising:

following the repeating, affixing a skin segment over the plurality of cure mandrels and to the plurality of stiffeners loaded on the inner mold line layup mandrel.

G3. The method of any of paragraphs G1.1-G2, wherein the affixing includes any suitable method disclosed in U.S. patent application Ser. No. 13/693,887, U.S. patent application Ser. No. 13/886,976, and/or U.S. patent application Ser. No. 13/887,006.

G4. The method of any of paragraphs G-G3, wherein the positioning the respective filler structure further includes positioning a noodle along the longitudinal edges of the respective filler structure.

G5. The method of any of paragraphs G-G4, further comprising:

prior to the positioning the respective stiffener, applying an adhesive to the upper side of the respective filler structure and/or applying an adhesive to a lower side of the respective stiffener;

wherein the positioning the respective stiffener includes adhering the respective stiffener to the upper side of the respective filler structure.

G6. The method of any of paragraphs G-G5, further comprising:

prior to the loading, applying an adhesive to an upper side of the respective stiffener and/or applying an adhesive to the respective stiffener form;

wherein the loading includes adhering the respective stiffener to the respective stiffener form.

G7. The method of any of paragraphs G5-G6, wherein the adhesive includes an adhesive strip.

G8. The method of any of paragraphs G-G7, wherein the loading includes:

positioning the loading tool vertically underneath the inner mold line layup mandrel; and raising the respective stiffener and the respective filler structure with the loading tool.

G9. The method of any of paragraphs G-G8, wherein the loading includes vacuum compacting, with the loading tool, the respective stiffener to the inner mold line layup mandrel and the respective filler structure within the respective stiffener cavity of the respective stiffener.

G9.1 The method of paragraph G9, wherein the vacuum compacting includes any suitable method disclosed in U.S. patent application Ser. No. 13/769,022.

G10. The method of any of paragraphs G-G9.1, further comprising:

prior to the repeating, rotating the inner mold line layup mandrel to position the inner mold line layup mandrel for subsequent loading of a subsequent stiffener and a subsequent filler structure.

G11. The method of any of paragraphs G1-G10 when depending from either of paragraph G1 or paragraph G2, further comprising:

following the repeating, curing the at least a portion of the stiffened composite structure.

G12. The method of any of paragraphs G1.1-G11 when depending from either of paragraph G1.1 or G2, further comprising:

following the affixing, repeating the repeating the positioning the respective filler structure, the positioning the respective stiffener charge, and the loading and repeating the affixing to form a greater portion of the stiffened composite structure.

G12.1. The method of paragraph G12, further comprising:

following the repeating the repeating the positioning the respective filler structure, the positioning the respective stiffener charge, and the loading and the repeating the affixing, assembling a plurality of formed portions of the stiffened composite structure to form the stiffened composite structure.

G13. The method of any of paragraphs G-G12.1, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

G14. The method of any of paragraphs G-G13, wherein the filler structures each include a filler structure body, a breather sock extending over the filler structure body, and filler release material extending over the breather sock.

G15. The method of any of paragraphs G-G14, wherein the filler structures are constructed of rubber, optionally when depending from paragraph G14, wherein the filler structure body is constructed of rubber or rubber-like material.

G16. The method of any of paragraphs G-G15, wherein the stiffeners include stringers.

G17. The method of any of paragraphs G-G16, wherein the stiffeners are constructed of fiber reinforced composite material, and optionally of pre-preg composite plies.

G18. The method of any of paragraphs G1-G17 when depending from paragraph G1, wherein the skin segments are constructed of fiber reinforced composite material, and optionally of pre-preg composite plies.

G19. The method of any of paragraphs G-G18, wherein the method utilizes the system of any of paragraphs I-I13.

H. A stiffened composite structure constructed using the method of any of paragraphs G-G19, optionally wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

I. A system for assembling stiffened composite structures, comprising:

a supply of stiffeners, wherein each stiffener defines a stiffener cavity;

a supply of filler structures, wherein each filler structure is configured to be positioned within a stiffener cavity;

an inner mold line layup mandrel, wherein the inner mold line layup mandrel includes a plurality of stiffener forms; and a loading tool configured to receive a respective filler structure from the supply of filler structures on an upper side of the loading tool and a respective stiffener on an upper side of the respective filler structure, and to operatively load the respective stiffener and the respective filler structure onto the inner mold line layup mandrel so that the respective stiffener and the respective filler structure are positioned within a respective stiffener form of the plurality of stiffener forms.

I1. The system of paragraph I, further comprising:
a supply of skin segments for loading onto the inner mold line layup mandrel.

I1.1. The system of paragraph I1, wherein the loading tool is further configured to receive a respective skin segment from the plurality of skin segments on the upper side of the loading tool beneath the respective filler structure, and wherein the loading tool is further configured to load the respective skin segment onto the inner mold line layup mandrel over the respective filler structure and the respective stiffener;

optionally wherein the loading tool is further configured to receive a respective skin segment on the upper side of the loading tool beneath more than one filler structure and more than stiffener, and wherein the loading tool is further configured to load the respective skin segment onto the inner mold line layup mandrel over the more than one filler structure and the more than one stiffener.

I1.2. The system of any of paragraphs I1-I1.1, further comprising:

a skin segment loading tool configured to load a respective skin segment from the supply of skin segments onto the inner mold line layup mandrel, onto a plurality of stiffeners loaded on the inner mold line layup mandrel, and over a plurality of filler structures located within respective stiffener cavities of the plurality of stiffeners, optionally wherein the skin segment loading tool includes any suitable structure disclosed in U.S. patent application Ser. No. 13/693,887, U.S. patent application Ser. No. 13/886,976, and/or U.S. patent application Ser. No. 13/887,006.

I2. The system of any of paragraphs I-I1.2, further comprising:

a supply of noodles configured to be positioned along the longitudinal edges of respective filler structures positioned on the upper surface of the loading tool and to be loaded on the inner mold line layup mandrel together with respective stiffeners and respective filler structures.

I3. The system of any of paragraphs I-I2, further comprising:

a supply of adhesive configured to be applied between the respective filler structure and the respective stiffener and between the respective stiffener and the inner mold line layup mandrel, optionally wherein the supply of adhesive includes a plurality of adhesive strips.

I4. The system of any of paragraphs I-I3, wherein the loading tool includes compaction structure that is configured to compact, optionally vacuum compact, the respective stiffener to the inner mold line layup mandrel and the respective filler structure within the respective stiffener cavity of the respective stiffener, and optionally wherein the compaction structure includes any suitable structure disclosed in U.S. patent application Ser. No. 13/769,022.

I5. The system of any of paragraphs I-I4, wherein the loading tool is configured to operatively load the respective stiffener and the respective filler structure from vertically underneath the inner mold line layup mandrel.

I6. The system of any of paragraphs I-I5, wherein the inner mold line layup mandrel includes rotation structure that is configured to rotate the inner mold line layup mandrel after each loading of the respective stiffener charge and the respective filler structure.

I7. The system of any of paragraphs I-I6, wherein the stiffener charges are constructed of fiber reinforced composite material, and optionally of pre-preg composite plies.

I8. The system of any of paragraphs I1-I7 when depending from paragraph I1, wherein the skin segments are constructed of fiber reinforced composite material, and optionally of pre-preg composite plies.

I9. The system of any of paragraphs I-I8, wherein each filler structure includes a filler structure body, a breather sock extending over the filler structure body, and filler release material extending over the breather sock.

I10. The system of any of any of paragraphs I-I9, wherein the filler structure is constructed of rubber or rubber-like material, optionally when depending from paragraph I9, wherein the filler structure body is constructed of rubber or rubber-like material.

I11. The system of any of paragraphs I-I10, further comprising:

a curing oven or autoclave configured to receive a stiffened composite structure assembled by the system and to cure the stiffened composite structure.

I12. The system of any of paragraphs I-I11, wherein the system is used to perform the method of any of paragraphs G-G19.

I13. The system of any of paragraphs I-I12, wherein the system is configured to construct one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of assembling a stiffened composite structure, comprising:
   providing a supply of filler structures;
   providing a supply of stiffener charges;
   positioning a respective filler structure from the supply of filler structures on an upper side of a loading tool;
   positioning a respective stiffener charge from the supply of stiffener charges on an upper side of the respective filler structure;
   following the positioning the respective filler structure and the positioning the respective stiffener charge, loading, with the loading tool, the respective stiffener charge and the respective filler structure onto an inner mold line layup mandrel, wherein the inner mold line layup mandrel includes a plurality of stiffener forms, and wherein the loading includes:
      positioning the loading tool vertically underneath the inner mold line layup mandrel; and
      raising the respective stiffener charge and the respective filler structure with the loading tool to conform the respective stiffener charge to a respective stiffener form of the plurality of stiffener forms to form a respective stiffener with a respective stiffener cavity and with the respective filler structure being positioned within the respective stiffener cavity;
   following the positioning the respective filler structure, the positioning the respective stiffener charge, and the loading, rotating the inner mold line layup mandrel to position the inner mold line layup mandrel for subsequent loading of a subsequent stiffener and a subsequent filler structure;
   following the rotating, repeating the positioning the respective filler structure, the positioning the respective stiffener charge, and the loading to load a plurality of stiffeners and a plurality of filler structures onto the inner mold line layup mandrel; and
   following the repeating, affixing a skin segment over the plurality of filler structures and to the plurality of stiffeners loaded on the inner mold line layup mandrel to form at least a portion of the stiffened composite structure.

2. A method of assembling a stiffened composite structure, comprising:
   providing a supply of filler structures;
   providing a supply of stiffener charges;
   positioning a respective filler structure from the supply of filler structures on an upper side of a loading tool;
   positioning a respective stiffener charge from the supply of stiffener charges on an upper side of the respective filler structure;
   following the positioning the respective filler structure and the positioning the respective stiffener charge, loading, with the loading tool, the respective stiffener charge and the respective filler structure onto an inner mold line layup mandrel, wherein the inner mold line layup mandrel includes a plurality of stiffener forms, and wherein the loading includes conforming the respective stiffener charge to a respective stiffener form of the plurality of stiffener forms to form a respective stiffener with a respective stiffener cavity and with the respective filler structure being positioned within the respective stiffener cavity; and
   repeating the positioning the respective filler structure, the positioning the respective stiffener charge, and the loading to load a plurality of stiffeners and a plurality of filler structures onto the inner mold line layup mandrel.

3. The method of claim 2, further comprising:
   following the positioning the respective stiffener charge and prior to the loading, deforming the respective stiffener charge at least partially over the upper surface of the respective filler structure.

4. The method of claim 2, further comprising:
   providing a plurality of skin segments; and
   prior to the positioning the respective filler structure, positioning a respective skin segment from the plurality of skin segments on the upper side of the loading tool;
   wherein the positioning the respective filler structure includes positioning the respective filler structure on an upper side of the respective skin segment;
   wherein the loading includes loading the respective skin segment onto the inner mold line layup mandrel over the respective filler structure and the respective stiffener; and
   wherein the repeating includes repeating the positioning the respective skin segment, the positioning the respective filler structure, the positioning the respective stiffener charge, and the loading to load a plurality of stiffeners, a plurality of filler structures, and a plurality of skin segments onto the inner mold line layup mandrel.

5. The method of claim 4, further comprising:

following the repeating, affixing a larger skin segment over the plurality of skin segments loaded on the inner mold line layup mandrel to form at least a portion of the stiffened composite structure.

6. The method of claim 2, further comprising:

prior to the positioning the respective stiffener charge, applying an adhesive to the upper side of the respective filler structure or to a lower side of the respective stiffener charge;

wherein the positioning the respective stiffener charge includes adhering the respective stiffener charge to the upper side of the respective filler structure.

7. The method of claim 2, further comprising:

prior to the loading, applying an adhesive to an upper side of the respective stiffener charge or to the respective stiffener form;

wherein the loading includes adhering the respective stiffener to the respective stiffener form.

8. The method of claim 2, wherein the loading includes:

positioning the loading tool vertically underneath the inner mold line layup mandrel; and raising the respective stiffener and the respective filler structure with the loading tool.

9. The method of claim 2, wherein the loading includes vacuum compacting, with the loading tool, the respective stiffener to the inner mold line layup mandrel and the respective filler structure within the respective stiffener cavity of the respective stiffener.

10. The method of claim 2, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

11. The method of claim 2, wherein the stiffener charges are constructed of pre-preg composite plies.

12. A method of assembling a stiffened composite structure, comprising:

providing a supply of stiffeners, wherein each stiffener defines a stiffener cavity;

providing a supply of filler structures;

positioning a respective filler structure from the supply of filler structures on an upper side of a loading tool;

positioning a respective stiffener from the supply of stiffeners on an upper side of the respective filler structure so that the respective filler structure is positioned within the stiffener cavity of the respective stiffener;

following the positioning the respective filler structure and the positioning the respective stiffener, loading, with the loading tool, the respective stiffener and the respective filler structure onto an inner mold line layup mandrel, wherein the inner mold line layup mandrel includes a plurality of stiffener forms, and wherein the loading includes positioning the respective stiffener and the respective filler structure within a respective stiffener form of the plurality of stiffener forms; and repeating the positioning the respective filler structure, the positioning the respective stiffener, and the loading to load a plurality of stiffeners and a plurality of filler structures onto the inner mold line layup mandrel.

13. The method of claim 12, further comprising:

providing a plurality of skin segments; and prior to the positioning the respective filler structure, positioning a respective skin segment from the plurality of skin segments on the upper side of the loading tool;

wherein the positioning the respective filler structure includes positioning the respective filler structure on an upper side of the respective skin segment;

wherein the loading includes loading the respective skin segment onto the inner mold line layup mandrel over the respective filler structure and the respective stiffener; and wherein the repeating includes repeating the positioning the respective skin segment, the positioning the respective filler structure, the positioning the respective stiffener, and the loading to load a plurality of stiffeners, a plurality of filler structures, and a plurality of skin segments onto the inner mold line layup mandrel.

14. The method of claim 13, further comprising:

following the repeating, affixing a larger skin segment over the plurality of skin segments loaded on the inner mold line layup mandrel.

15. The method of claim 12, further comprising:

prior to the positioning the respective stiffener, applying an adhesive to the upper side of the respective filler structure and/or applying an adhesive to a lower side of the respective stiffener;

wherein the positioning the respective stiffener includes adhering the respective stiffener to the upper side of the respective filler structure.

16. The method of claim 12, further comprising:

prior to the loading, applying an adhesive to an upper side of the respective stiffener and/or applying an adhesive to the respective stiffener form;

wherein the loading includes adhering the respective stiffener to the respective stiffener form.

17. The method of claim 12, wherein the loading includes:

positioning the loading tool vertically underneath the inner mold line layup mandrel; and raising the respective stiffener and the respective filler structure with the loading tool.

18. The method of claim 12, wherein the loading includes vacuum compacting, with the loading tool, the respective stiffener to the inner mold line layup mandrel and the respective filler structure within the stiffener cavity of the respective stiffener.

19. The method of claim 12, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

20. The method of claim 12, wherein the stiffeners are constructed of pre-preg composite plies.

* * * * *